United States Patent
Ito et al.

(10) Patent No.: US 10,029,551 B2
(45) Date of Patent: Jul. 24, 2018

(54) ELECTRIC WORK VEHICLE, BATTERY PACK FOR ELECTRIC WORK VEHICLE AND CONTACTLESS CHARGING SYSTEM

(71) Applicant: Kubota Corporation, Osaka-shi (JP)

(72) Inventors: Hirokazu Ito, Sakai (JP); Kazuo Koike, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/352,059

(22) Filed: Nov. 15, 2016

(65) Prior Publication Data

US 2017/0136864 A1  May 18, 2017

(30) Foreign Application Priority Data

Nov. 16, 2015 (JP) ................................ 2015-224090
Nov. 16, 2015 (JP) ................................ 2015-224091
Mar. 29, 2016 (JP) ................................ 2016-065374

(51) Int. Cl.
*B60K 1/04* (2006.01)
*B60L 11/18* (2006.01)
(Continued)

(52) U.S. Cl.
CPC ............... *B60K 1/04* (2013.01); *A01D 34/78* (2013.01); *A01D 34/82* (2013.01); *B60K 7/0007* (2013.01); *B60K 17/043* (2013.01); *B60L 11/182* (2013.01); *B60L 11/1824* (2013.01); *B60L 11/1874* (2013.01); *B60L 11/1877* (2013.01); *H01M 2/1083* (2013.01); *H01M 10/625* (2015.04); *A01D 69/02* (2013.01); *A01D 2101/00* (2013.01); *B60K 2001/005* (2013.01);
(Continued)

(58) Field of Classification Search
CPC .......... B60K 1/04; B60K 1/00; B60K 7/0007; A01D 34/78; A01D 34/82
See application file for complete search history.

(56) References Cited

U.S. PATENT DOCUMENTS 4,174,014 A * 11/1979 Bjorksten ................ B60K 1/04
                                                    180/68.5
4,267,895 A *  5/1981 Eggert, Jr. ................ B60K 1/04
                                                    180/291
(Continued)

FOREIGN PATENT DOCUMENTS

JP        2008168869 A       7/2008
JP         201321987 A       2/2013
(Continued)

*Primary Examiner* — Hau V Phan
(74) *Attorney, Agent, or Firm* — The Webb Law Firm

(57) ABSTRACT

An electric work vehicle includes: a battery pack that is arranged between a left rear wheel arranged outside of a left frame and a right rear wheel arranged outside of a right frame, the front end of the battery pack being located forward of an axle center of a rear wheel unit; a left motor that is arranged above the battery pack, in the periphery of the left rear wheel, receives a supply of power from the battery pack, and transmits rotational power to the left rear wheel; and a right motor that is arranged above the battery pack, in the periphery of the right rear wheel, receives a supply of power from the battery pack, and transmits rotational power to the right rear wheel.

15 Claims, 16 Drawing Sheets

(51) Int. Cl.
*B60K 7/00* (2006.01)
*B60K 17/04* (2006.01)
*A01D 34/78* (2006.01)
*A01D 34/82* (2006.01)
*H01M 2/10* (2006.01)
*H01M 10/625* (2014.01)
*A01D 69/02* (2006.01)
*B60K 1/00* (2006.01)
*A01D 101/00* (2006.01)

(52) U.S. Cl.
CPC ............ *B60K 2001/0416* (2013.01); *B60K 2007/0053* (2013.01); *B60K 2007/0061* (2013.01); *B60L 2200/40* (2013.01); *B60L 2220/42* (2013.01); *B60L 2220/46* (2013.01); *B60Y 2200/223* (2013.01); *B60Y 2300/91* (2013.01); *B60Y 2304/01* (2013.01); *B60Y 2400/112* (2013.01)

(56) References Cited

U.S. PATENT DOCUMENTS

| | | | | |
|---|---|---|---|---|
| 5,156,225 A * | 10/1992 | Murrin | ............ | B60K 1/04 180/60 |
| 5,639,571 A * | 6/1997 | Waters | ............ | B60L 11/1874 180/68.5 |
| 5,704,644 A * | 1/1998 | Jaggi | ............ | B60K 1/00 180/311 |
| 7,771,865 B2 * | 8/2010 | Takasaki | ............ | B60K 1/04 429/71 |
| 7,926,602 B2 * | 4/2011 | Takasaki | ............ | B60K 1/04 180/65.29 |
| 8,464,817 B2 * | 6/2013 | Usami | ............ | B60K 1/04 180/68.5 |
| 8,717,761 B2 * | 5/2014 | Aoki | ............ | B60K 1/04 165/104.33 |
| 8,776,927 B2 * | 7/2014 | Akazawa | ............ | B60K 1/04 180/65.1 |
| 8,789,634 B2 * | 7/2014 | Nitawaki | ............ | B60K 1/04 180/68.5 |
| 9,160,042 B2 * | 10/2015 | Fujii | ............ | B60K 1/04 |
| 9,346,346 B2 * | 5/2016 | Murray | ............ | B60K 1/04 |
| 2009/0000839 A1 | 1/2009 | Ishii et al. | | |
| 2009/0186266 A1 * | 7/2009 | Nishino | ............ | B60K 1/04 429/120 |
| 2012/0095636 A1 | 4/2012 | Ishii et al. | | |
| 2012/0159916 A1 | 6/2012 | Ishii et al. | | |
| 2013/0252059 A1 * | 9/2013 | Choi | ............ | B29C 70/20 429/100 |
| 2014/0059989 A1 | 3/2014 | Ishii et al. | | |
| 2014/0338999 A1 * | 11/2014 | Fujii | ............ | B60K 1/04 180/68.5 |
| 2016/0029555 A1 | 2/2016 | Ishii et al. | | |

FOREIGN PATENT DOCUMENTS

| | | |
|---|---|---|
| JP | 201475181 A | 4/2014 |
| JP | 201482339 A | 5/2014 |
| WO | 2013015171 A1 | 1/2013 |

* cited by examiner

ELECTRIC WORK VEHICLE, BATTERY PACK FOR ELECTRIC WORK VEHICLE AND CONTACTLESS CHARGING SYSTEM

CROSS-REFERENCE TO RELATED APPLICATIONS

This application claims priority to Japanese Patent Application Nos. 2015-224090 and 2015-224091, both filed Nov. 16, 2015, and Japanese Patent Application No. 2016-065374 filed Mar. 29, 2016, the disclosures of which are hereby incorporated in their entirety by reference.

BACKGROUND OF THE INVENTION

Field of the Invention

The present invention relates to an electric work vehicle such as an electric mower, a battery pack for an electric work vehicle, and a contactless charging system.

Description of Related Art

First Related Art

In the field of passenger vehicles, electric vehicles that travel using the rotational force of an electric motor have started to become widespread. In such a case, a battery is mounted in the vehicle as the power source of the electric motor. The battery temperature needs to be kept at a suitable temperature in order to maintain the performance of the battery, and therefore a cooling structure is often included in the battery. For example, with a vehicle battery pack disclosed in JP 2014-075181 A, a battery cell group, which is multiple battery cells, and a cooling fan that allows air to flow to the battery cell group are accommodated in a case. In the case, an inlet through which air is guided from the outside into the case, and an outlet through which air is discharged to the outside of the case are formed. Air flow that occurs due to the cooling fan being driven so as to rotate passes through an air suction flow path that extends in the gaps between the battery cells and in a bottom portion space between the inner side bottom surface of the case and the bottom surface of the battery cell group. In other words, the cooling air guided from the outside of the vehicle to the inside of the case through the inlet is discharged from the outlet to the outside of the case via the air suction flow path, the bottom portion space, and the gaps between the battery cells. Furthermore, multiple heat radiating fins that protrude downward are provided on the lower surface of the case.

However, in a work vehicle that travels while performing work, as with a mower, a rice transplanter, a tractor, or the like, the surrounding environment for work travel is worse compared to the surrounding environment of an automobile or the like, and if cooling air is taken in from the surroundings, waste such as cut grass or straw tends to be mixed in with the cooling air, which causes the problem of clogging of the cooling air passage.

In view of the foregoing circumstances, there has been demand for a battery pack having a structure that is suitable for an electric work vehicle that performs work travel in a surrounding environment in which foreign matter such as grass or straw is floating. In such a case, if multiple battery modules are included in such a battery pack, it is also important to make the temperatures of the battery modules as uniform as possible.

Second Related Art

WO 2013/015171 A1 discloses a lawnmower in which a left and right pair of rear wheels are driven independently by a left and right pair of motors. The left and right pair of rear wheels are supported by a rear axle case extending therebetween. A gear case extends from a central portion of the rear axle case, perpendicular to the direction in which the rear axle case extends, a left-side motor is furthermore equipped on the left side so as to extend in the vehicle lateral direction from the leading end of the gear case, and a right-side motor is furthermore equipped on the right side so as to extend in the vehicle lateral direction from the leading end of the gear case. The rotational power of the motors is transmitted to an axle mounted in the rear axle case via a power transmission mechanism mounted in the gear case. As is apparent from FIG. 2 of WO 2013/015171 A1, a left and right pair of motors that extend linearly in the vehicle body lateral direction and a rear axle case that extends linearly in the vehicle body lateral direction are joined at respective central portions by a gear case that extends in the vehicle body front-rear direction. Accordingly, the case structure in which a mechanism for transmitting the power from the motors to the rear wheels is mounted has a rather complicated shape, and causes an increase in cost. Furthermore, since the left and right pair of motors are arranged inside of the vehicle body frame and the battery is arranged between the left and right pair of motors, there is a problem in that a large-sized battery cannot be used.

JP 2008-168869 A (or US 2009/0000839 A1 corresponding thereto) discloses a hybrid lawnmower in which a left motor that drives a left rear wheel and a right motor that drives a right rear wheel are each attached to the outside of a frame, and an engine and a battery are arranged between the left motor and the right motor. The left motor and the right motor are wheel motors, and the rear wheel axle centers match the motor rotational axis center. With this structure, the engine and the battery pack, which have large weights, are located rearward of the rear wheel axle center, as a result of which the weight balance regarding the rear wheel axle center deteriorates. However, since the center of gravity of the left motor and the right motor is substantially on the rear wheel axle center, the left motor and the right motor cannot improve the deterioration of the weight balance.

In view of the foregoing circumstances, there has been demand for improvement of vehicle body balance and for ensurement of sufficient battery space in an electric work vehicle including a left motor that drives a left rear wheel and a right motor that drives a right rear wheel.

Third Related Art

With a forklift disclosed in JP 2014-082339 A, a primary-side contactless power supply pad (primary-side coil) laid on the ground surface and a secondary-side contactless power supply pad (secondary-side coil) that receives power through electromagnetic coupling are provided between a front wheel and a rear wheel on one side of the lower surface of the forklift. In the case where a forklift mechanism serving as a work apparatus attached to a traveling vehicle body is arranged forward of the front wheels, as with a forklift, there is relative spatial leeway below the vehicle body between the front wheels and the rear wheels, and therefore the secondary-side coil can be arranged between the front wheels and the rear wheels. The primary-side coil is provided on the ground surface or on a support platform arranged on the ground surface.

With an electric mower, a mower unit serving as the work apparatus attached to the traveling vehicle body is arranged forward of the rear wheels, and therefore there is little space that can be used freely below the vehicle body frame in the region forward of the rear wheels, or in other words, in the region near the ground surface. Also, because the weight of the battery pack is large, for the stability of the vehicle body, it is preferable to arrange the battery pack at a low position on the vehicle body. Because of this, in a contactless charging system used in an electric work vehicle such as an electric mower, suitable arrangement of the battery pack, the primary-side coil, and the secondary-side coil is important.

SUMMARY OF THE INVENTION

[1] In order to solve the problem stated in the "First Related Art", an electric work vehicle battery pack includes: a sealed battery case including a front case portion and a rear case portion; a horizontal partitioning wall that divides an interior of the front case portion into a first space and a second space in a vertical direction, and divides an interior of the rear case portion into a third space and a fourth space in the vertical direction; a battery electric unit accommodated in one of the first space, the second space, the third space and the fourth space; and a battery module accommodated in each of the remaining spaces among the first space, the second space, the third space and the fourth space.

Note that "sealed" above does not mean that the interior space of the battery case is kept in a completely airtight state, but is used as a term with a broader meaning that encompasses a loosely airtight state in which the flow of outside air to the interior space is suppressed and the outside air temperature and the temperature of the interior space are not easily equalized.

Also, the phrases "first space", "second space", "third space", and "fourth space" do not limit the number of divided spaces to four, and the battery case may be further divided into a fifth space, a sixth space, and the like.

In this configuration, the interior of the sealed battery case is divided into multiple spaces by a horizontal partitioning wall, a battery electric unit is arranged in one space, and battery modules are arranged in the remaining spaces. Thus, waste such as cut grass or straw substantially does not enter the interior of the battery case. Also, because the interior of the battery case is divided vertically by the horizontal partitioning wall, the heat emitted from the multiple battery modules is prevented from being focused on the roof region of the battery case.

As a particularly preferable embodiment, a circulation fan configured to create a circulated air flow that circulates through the first space, the second space, the third space and the fourth space is included. In this configuration, multiple battery modules and a circulation fan are accommodated in a sealed manner in one battery case, and by circulating the air in the case internal space using the circulation fan and suppressing the entrance of outside air by sealing the battery case, the temperature of the case internal space is uniformized while foreign matter from the outside is prevented from entering. In this case, when the electric unit and the battery modules are arranged such that the cooling air created by the circulation fan passes through the electric unit and the battery modules in sequence, the temperature distribution of the battery modules can be made as uniform as possible. Accordingly, the temperature distribution of the battery module is easier to make uniform, and the battery modules electrically operate efficiently.

Note that the scope of the present invention extends also to an electric work vehicle in which the above-described battery pack is mounted.

[2] In order to solve the problem stated in the "Second Related Art", an electric work vehicle that includes a left motor and a right motor that receive a supply of power from a battery pack, and that performs travel work by using the left motor to drive a left rear wheel and using the right motor to drive a right rear wheel includes: a left frame and a right frame that extend in a vehicle body front-rear direction with an interval therebetween in a vehicle body lateral direction; a rear wheel unit having a left rear wheel arranged outside of the left frame in the vehicle body lateral direction and a right rear wheel arranged outside of the right frame in the vehicle body lateral direction; a battery pack arranged between the left rear wheel and the right rear wheel, a front end of the battery pack being located forward of an axle center of the rear wheel unit in the vehicle body front-rear direction; a left motor that is arranged above the battery pack in the periphery of the left rear wheel and is configured to receive a supply of power from the battery pack and transmit rotational power to the left rear wheel; and a right motor that is arranged above the battery pack in the periphery of the right rear wheel and is configured to receive a supply of power from the battery pack and transmit rotational power to the right rear wheel.

With this configuration, due to the fact that the front end portion of the battery pack is located further forward relative to the rear wheel axle, the center of gravity of the battery pack does not deviate significantly from the rear wheel axle in a side view even if the battery pack is lengthened and the rear end portion thereof is located rearward. Therefore, adverse effects that the weight of the battery pack has on the vehicle body balance of the vehicle body are reduced. Also, by arranging the left motor and the right motor above the battery pack, the space above the battery pack is used effectively, the overall length of the vehicle body is suppressed, and an increase in compactness is possible.

In this case, if the battery pack is arranged such that the center of gravity of the battery pack is within a rear wheel segment defined by the left rear wheel and the right rear wheel in the vehicle body front-rear direction and the vehicle body lateral direction in plan view, adverse effects that the battery pack has on the stability of the vehicle body can mostly be ignored. The rear wheel segment in this context is a rectangle that is centered about the rear axle center, which is the axle center of the rear wheels, and is obtained by using the rear wheel radius as the length of one side in the vehicle body front-rear direction and by using the interval between the left rear wheel and the right rear wheel as the length of the other side. More preferably, the center of gravity of the battery pack is located on a center line in the vehicle body front-rear direction and is within the length of the radius of the rear wheel from the rear axle center in the vehicle body front-rear direction. Accordingly, the weight of the battery pack contributes to the stability of the vehicle body.

From the viewpoint of the stability of the vehicle body, it is desirable that the battery pack, which is a heavy load, is arranged at a low position. However, if the above-ground height of the battery pack is low, an inconvenience occurs in which the rear end portion of the battery pack comes into contact with the ground surface during off-road travel or uphill travel. In order to eliminate this inconvenience and ensure that the center of gravity of the battery pack is as low as possible, it is desirable to lower the above-ground height of the front portion of the battery pack and raise the above-ground height of the rear portion of the battery pack. For this reason, in a preferred embodiment of the present invention, the battery pack includes a front-side rectangular cuboid portion and a rear-side rectangular cuboid portion shifted upward relative to the front-side rectangular cuboid portion, and is formed as a level-difference three-dimensional shape having level differences on an upper surface and a lower surface of the battery pack between the front-side rectangular cuboid portion and the rear-side rectangular cuboid portion. In particular, in order to suppress contact with the ground surface during off-road travel or uphill travel, it is preferable that the rear end of the battery pack is located rearward of the rear wheel unit in the vehicle body front-rear direction, and the above-ground height of the rear end of the battery pack is configured to be higher than the above-ground height of the rear axle case.

[3] In order to solve the problem stated in the "Third Related Art", a contactless charging system for an electric work vehicle includes: a primary coil unit that includes a coil power supply circuit portion and a primary coil arranged above the coil power supply circuit portion, and is arranged on a ground surface; a battery pack arranged at a rear portion of a vehicle body frame, between a left and right pair of rear wheels; a secondary coil that electromagnetically couples with the primary coil; a charging circuit portion configured to rectify power from the secondary coil and supply the rectified power to the battery pack; and a coil support member for arranging the secondary coil below the battery pack.

With this configuration, a primary coil unit having a coil power supply circuit portion and a primary coil is arranged on a ground surface side, and a secondary coil unit that electromagnetically couples with the primary coil is attached on the vehicle body side of the electric work vehicle. With the coil support member, the secondary coil is arranged below the battery pack, which is arranged between the left and right pair of rear wheels in the rear portion of the vehicle body frame. In order to avoid contact with an obstacle that exists on the ground surface during travel, the secondary coil is arranged at a position that is as high from the ground as possible, and therefore the position of the primary coil needs to be made higher. With this configuration, the primary coil unit has a two-stage structure, the coil power supply circuit portion being arranged on the lower stage, and the primary coil unit being arranged on the upper stage. Therefore, the primary coil unit is at a high position from the ground surface, which is structurally convenient.

The charging circuit portion includes a rectifier through which a large current flows, and has a relatively large shape. Therefore, the charging circuit portion requires a wide and stable installation location. For this reason, in a preferred embodiment according to the present invention, the charging circuit portion is attached to an upper portion of the battery pack. Due to the fact that the outer shape of the battery pack is relatively simple, as with a rectangular cuboid or a combination of rectangular cuboids, the upper portion of the battery pack is relatively wide and flat, and therefore the charging circuit portion is stably attached to the upper portion.

Furthermore, in one preferred embodiment of the present invention, a recessed portion is formed at a rear-side lower portion of the battery pack and the secondary coil is arranged in the recessed portion. Accordingly, the surroundings of the secondary coil are at least partially protected by the battery pack, which has a high rigidity, and therefore damage or the like caused by contact with an outside object is suppressed.

If the air pressure of the rear tires fluctuates or if the weight of additional freight fluctuates, the above-ground height of the secondary coil attached to the electric work vehicle side will change, and the interval between the primary coil and the secondary coil will deviate from an optimal value. This adversely affects the charging efficiency, and therefore the interval between the primary coil and the secondary coil needs to be brought near the optimal value. For this purpose, in one preferred embodiment of the present invention, the primary coil unit is provided with an elevation mechanism configured to raise and lower the primary coil. With the elevation mechanism, the above-ground height of the primary coil can be adjusted, and the interval between the primary coil and the secondary coil can be set to the optimal value.

In a preferred embodiment of an electric mower in which a contactless charging system is incorporated, a mower unit hangs down elevatably at a front portion of the vehicle body frame, and an electric motor unit configured to drive the rear wheels using power supplied from the battery pack via a motor power supply circuit portion is arranged forward of an axle center of the rear wheels, between the rear wheels. With this configuration, with the mower unit and the electric motor unit, it is possible to solve the problem in which the center of gravity of the vehicle body is located rearward in the vehicle body and the vehicle body balance deteriorates due to the battery pack being arranged on the rear portion of the vehicle body frame.

Furthermore, in one preferred embodiment of the electric mower, the electric motor unit includes a left motor that drives one rear wheel via a left transmission, and a right motor that drives the other rear wheel via a right transmission, the left motor and the left transmission being arranged between the one rear wheel and the battery pack, and the right motor and the right transmission being arranged between the other rear wheel and the battery pack. With this configuration, stability of the vehicle body and compactness of the travel power transmission system are achieved by consolidating heavy loads such as the electric motor unit and the transmission, which constitute the travel power transmission system, near the axle center of the rear wheel.

The mower unit is near the ground surface during mowing work travel, and is pulled up to its highest position away from the ground during non-work travel. The mower unit is located forward in the vehicle body relative to the secondary coil, and therefore fulfills the role of a guard for the secondary coil during travel. For this reason, it is preferable that the lower surface of the mower unit at the highest position is set to be lower than the lower surface of the secondary coil.

Other features and advantages will become apparent upon reading the embodiments described below with reference to the accompanying drawings.

DETAILED DESCRIPTION OF PREFERRED EMBODIMENTS

In the description hereinafter, unless explicitly described otherwise, a "vehicle body front-rear direction" is a direction of a vehicle body central axis (also referred to as "vehicle body longitudinal axis") that extends in a horizontal direction along a travel direction of the vehicle body on which a battery pack is mounted. A "vehicle body lateral direction" (also referred to simply as "lateral direction") is a direction that extends in the horizontal direction, orthogonal to the vehicle body central axis. "Front (forward)" means on the forward side in the vehicle body front-rear direction, and "rear (rearward)" means on the reverse side in the vehicle body front-rear direction. "Left (leftward)" means left when facing the vehicle body forward direction, and "right (rightward)" means right when facing the vehicle body forward direction.

First Embodiment

Prior to describing specific embodiments of the battery pack relating to the present invention, a basic structure of the battery pack mounted in the electric work vehicle will be described with reference to FIG. 1, and a basic arrangement of the battery pack at the time of mounting such a battery pack in the electric work vehicle will be described with reference to FIGS. 2 and 3.

Figure 1:
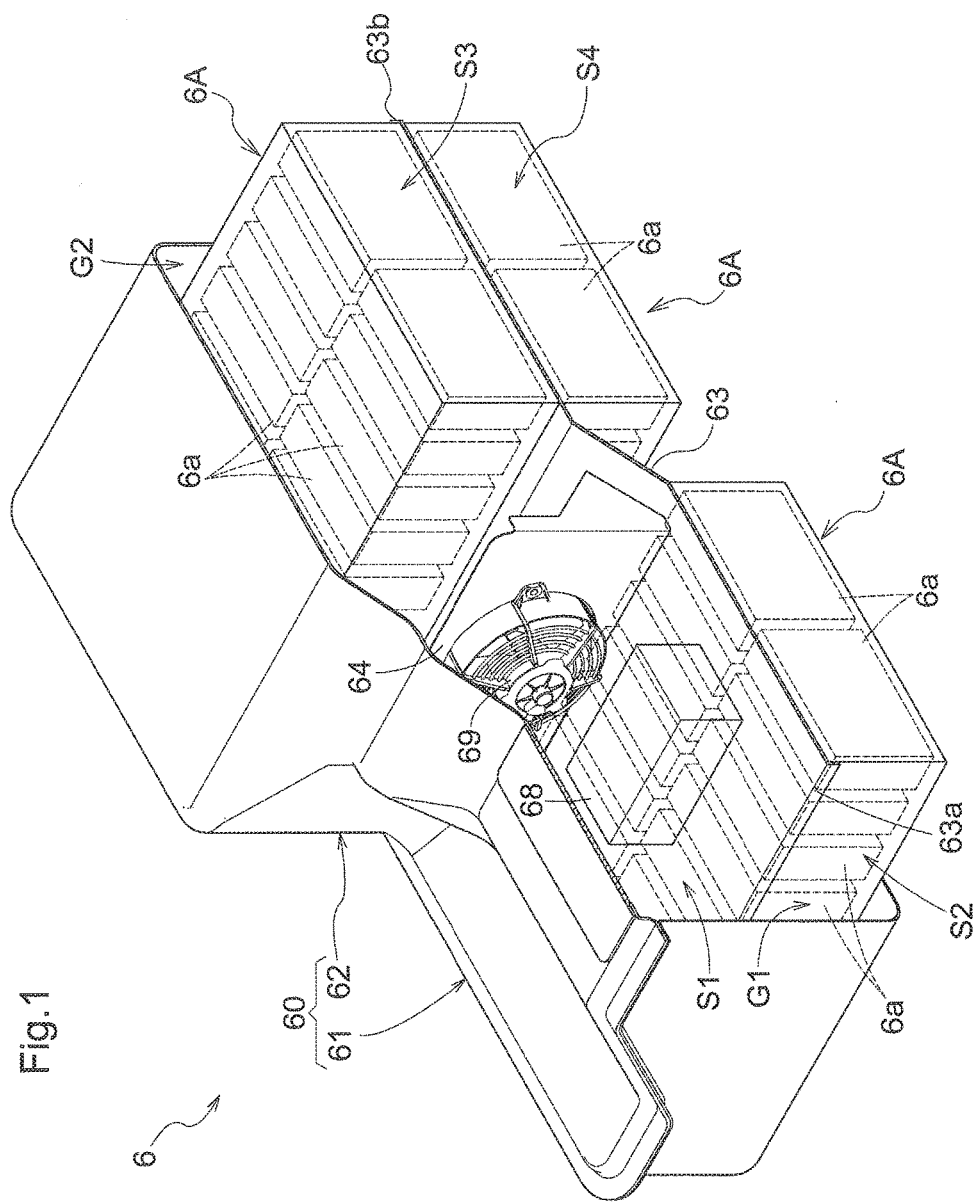
FIG. 1 is a diagram showing a first embodiment (same through to FIG. 9), and is a partially cut-away perspective view showing a basic structure of a battery pack.

A battery pack 6 as shown in FIG. 1 includes a battery case 60, a horizontal partitioning wall 63, a battery electric unit 68 (a group of electric devices/accessories related to a battery; the collective nomination will be simply referred to as "electric unit 68" also) and multiple battery modules 6A. The battery case 60 is a sealed case including a front case portion 61 and a rear case portion 62. Note that in FIG. 1, the left side is defined as the front side (forward), and the right side is defined as the rear side (rearward). The front case portion 61 and the rear case portion 62 are not individual members, but are respective nominations of a front-side portion and a rear-side portion when considering the battery case 60 as being divided into a front-side portion and a rear-side portion. The battery case 60 is formed continuously by the front case portion 61 and the rear case portion 62. In the example as shown in FIG. 1, a region of transitioning from the front case portion 61 to the rear case portion 62 is inclined upward. Accordingly, the rear case portion 62 is shifted to the upper side relative to the front case portion 61 in the vertical direction, and the battery case 60 is a three-dimensional object having an upward level difference in the middle. This level difference is required due to restrictions on site such as an installation space or the like. Therefore, the battery case 60 may have a downward level difference, or there may be no level difference.

The horizontal partitioning wall 63 is a plate member that is provided so as to approximately divide the interior of the battery case 60 into two parts, namely an upper and a lower part. The interior of the front case portion 61 is divided in the up-down direction into a first space S1 and a second space S2 by the horizontal partitioning wall 63, and the interior of the rear case portion is divided in the up-down direction into a third space S3 and a fourth space S4 by the horizontal partitioning wall 63. The first space S1 and the third space S3 are in communication and form an upper portion space of the battery case. Similarly, the second space S2 and the fourth space S4 are in communication and form a lower portion space of the battery case. A front end gap G1 that allows air flow between the first space S1 and the second space S2 is formed between a front end 63a of the horizontal partitioning wall 63 and a wall surface in front of the horizontal partitioning wall 63. A rear end gap G2 (FIG. 8) that allows air flow between the third space S3 and the fourth place S4 is formed between a rear end 63b of the horizontal partitioning wall 63 and a wall surface behind the horizontal partitioning wall 63. Accordingly, an air circulation path is formed within the battery case 60 that extends from the first space S1, passes through the second space S2, the fourth space S4 and the third space S3, and returns to the first space S1.

In the example as shown in FIG. 1, the electric unit 68 is arranged in the first space S1, and one battery module 6A is arranged in each one of the second space S2, the third space S3 and the fourth space S4. The battery module 6A is formed by a number of battery cells 6a. Furthermore, a circulation fan 69 is arranged in the first space S1 so as to send air from the first space S1 to the third space S3. Accordingly, a flow path for circulated air is created, on which air passes through the first space S1, the third space S3, the fourth space S4, the second space S2 and back to the first space S1 in the stated order. The flow of the circulated air not only cools the electric unit 68, but also uniformizes the temperatures of the second space S2, the third space S3 and the fourth space S4, in which the battery modules 6A are arranged. Accordingly, malfunction of the battery module 6A caused by non-uniformity in the temperature distribution is prevented.

The battery case 60 is configured to be at least partially removable or has an opening formed therein to be closed by a lid, for the purpose of maintenance inspection of the electric unit 68 or the battery modules 6A.

Figure 2:
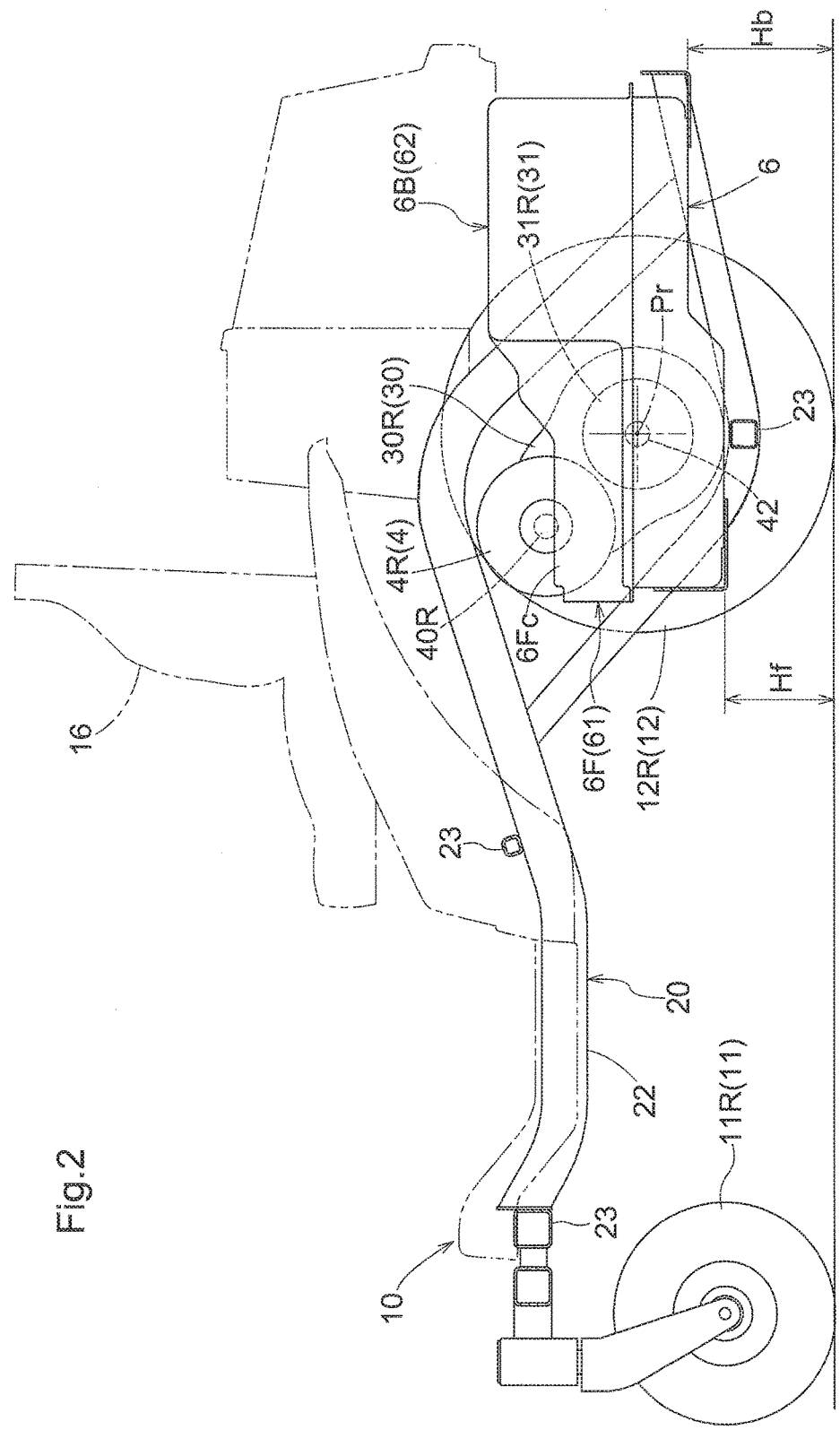
FIG. 2 is a side view schematically showing a relationship between the battery pack mounted in an electric work vehicle and rear wheels.
Figure 3:
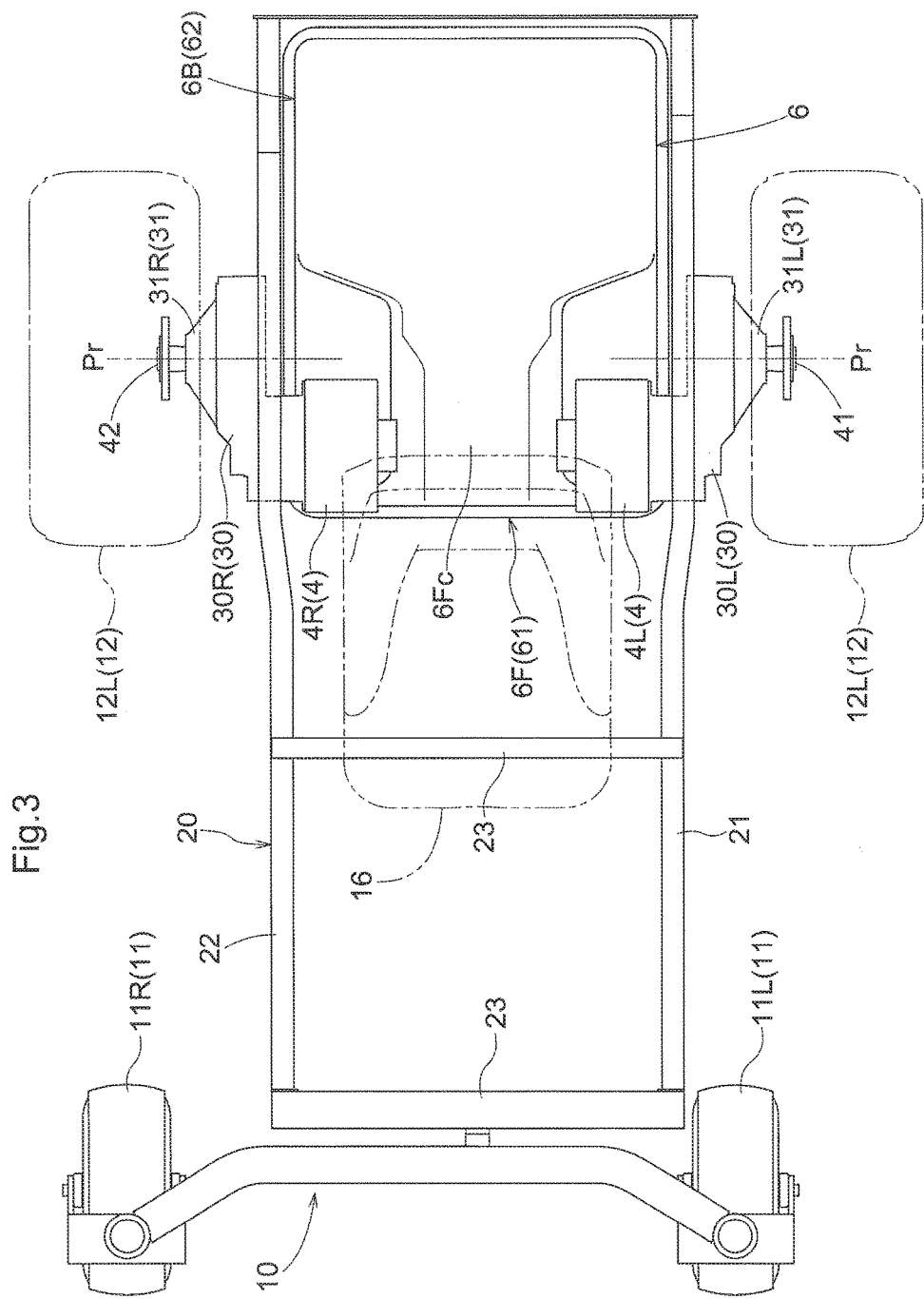
FIG. 3 is a plan view schematically showing a relationship between the battery pack mounted in the electric work vehicle and the rear wheels.

FIGS. 2 and 3 are a side view and a plan view, respectively, for illustrating a basic example of mounting the battery pack 6 as shown in FIG. 1 in the electric work vehicle. The electric work vehicle includes a vehicle body frame 20 that includes a left frame 21 and a right frame 22 that extend in the vehicle body front-rear direction with an interval therebetween in the vehicle body lateral direction, and at least one crossbeam 23 that connects the left frame 21 and the right frame 22. A left front wheel 11L and a right front wheel 11R that constitute a front wheel unit are arranged at a front portion of the vehicle body frame 20. A left rear wheel 12L and a right rear wheel 12R that constitute a rear wheel unit are arranged on a rear side relative to the center of the vehicle body frame 20. Hereinafter, if there is no particular need to make a distinction, the left front wheel 11L and the right front wheel 11R will be referred to collectively as "front wheel unit 11", and the left rear wheel 12L and the right rear wheel 12R will be referred to collectively as "rear wheel unit 12". A rear axle center Pr extends in a vehicle body lateral direction.

The battery pack 6 is arranged in a rear half region of the vehicle body frame 20 between the left frame 21 and the right frame 22. In a lateral side view, the front end of the battery pack 6 is located forward of the rear axle center Pr and approximately near the front end of the rear wheel unit 12. The rear end of the battery pack 6 is located approximately at the rear end of the vehicle body frame 20. As is apparent from FIG. 3, the battery pack 6 has a width sufficient to snugly fit the battery pack 6 between the left frame 21 and the right frame 22, and extends with an equal width in the vehicle body front-rear direction. Also, as is apparent from FIG. 2, the front half portion of the battery pack 6 is in the axle space of the rear wheel unit 12. As a more preferable mode of arranging the battery pack 6, the center of gravity of the battery pack 6 is in the region between the front end and the rear end of the rear wheel unit 12 on a center line in the vehicle body front-rear direction. In other words, the center of gravity of the battery pack 6 is within the distance of the rear wheel unit 12 from the rear axle center Pr in the vehicle body front-rear direction. Accordingly, the weight of the battery pack 6 contributes to the stability (favorable balance) of the vehicle body.

Furthermore, the battery pack 6 has a shape in which the rear case portion 62 is shifted to the upper side relative to the front case portion 61 in the up-down direction. In other words, the battery pack 6 has a three-dimensional shape constituted by a front-side rectangular cuboid portion 6F and a rear-side rectangular cuboid portion 6B, and the rear-side rectangular cuboid portion 6B protrudes upward relative to the front-side cuboid portion 6F. In other words, an upward level difference is formed on the upper surface and the lower surface of the battery pack 6.

Accordingly, an above-ground height Hb of the rear case portion 62 of the battery pack 6 is higher than an above-ground height Hf of the front case portion 61 of the battery pack 6. In the example as shown in FIG. 2, the above-ground height Hf of the front case portion 61 is approximately the same as the above-ground height of the lower end of the rear axle case 31 of the rear wheel unit 12. The above-ground height Hb of the rear case portion 62 of the battery pack 6 is higher than the above-ground height of the rear axle case 31 and is approximately the same as the above-ground height of the rear axle center Pr. The lowest above-ground height of the vehicle body frame 20 at the portion supporting the battery pack 6 approximately coincides with the lowest above-ground height of the battery pack 6. Due to the above-ground height Hf of the front case portion 61 being set to be lower, the center of gravity of the battery pack 6 is lower, and travel stability is more preferable. Also, due to the above-ground height Hb of the rear case portion 62 being set to be higher, the rear end of the battery pack 6 or the vehicle body frame 20 is less likely to collide with the ground surface or stones during uphill travel or off-road travel.

The left motor 4L that transmits the rotational power to the left rear wheel 12L is arranged near the front case portion 61 of the battery pack in the periphery of the left rear wheel 12L. The right motor 4R that transmits the rotational power to the right rear wheel 12R is arranged near the rear case portion 62 in the periphery of the right rear wheel 12R. The left motor 4L and the right motor 4R are arranged at left-right symmetrical positions. In order to create spaces for arranging the left motor 4L and the right motor 4R, the portion covering the first space S1 of the front case portion 61 may be recessed. A driver seat 16 is arranged above the left motor 4L and the right motor 4R, and thus space is used effectively.

For further effective use of space, in the battery pack 6 illustrated in FIG. 1, the front-side rectangular cuboid portion 6F of the battery pack 6 has a protruding central portion 6Fc that extends in the vehicle body front-rear direction, with an upper right portion and an upper left portion of the front-side rectangular cuboid portion 6F being removed. Due to this, spaces are created on the left and right of the central portion 6Fc. The left motor 4L enters the space on the left side of the central portion 6Fc of the front-side rectangular cuboid portion 6F, and the right motor 4R enters the space on the right side of the central portion 6Fc.

Figure 4:
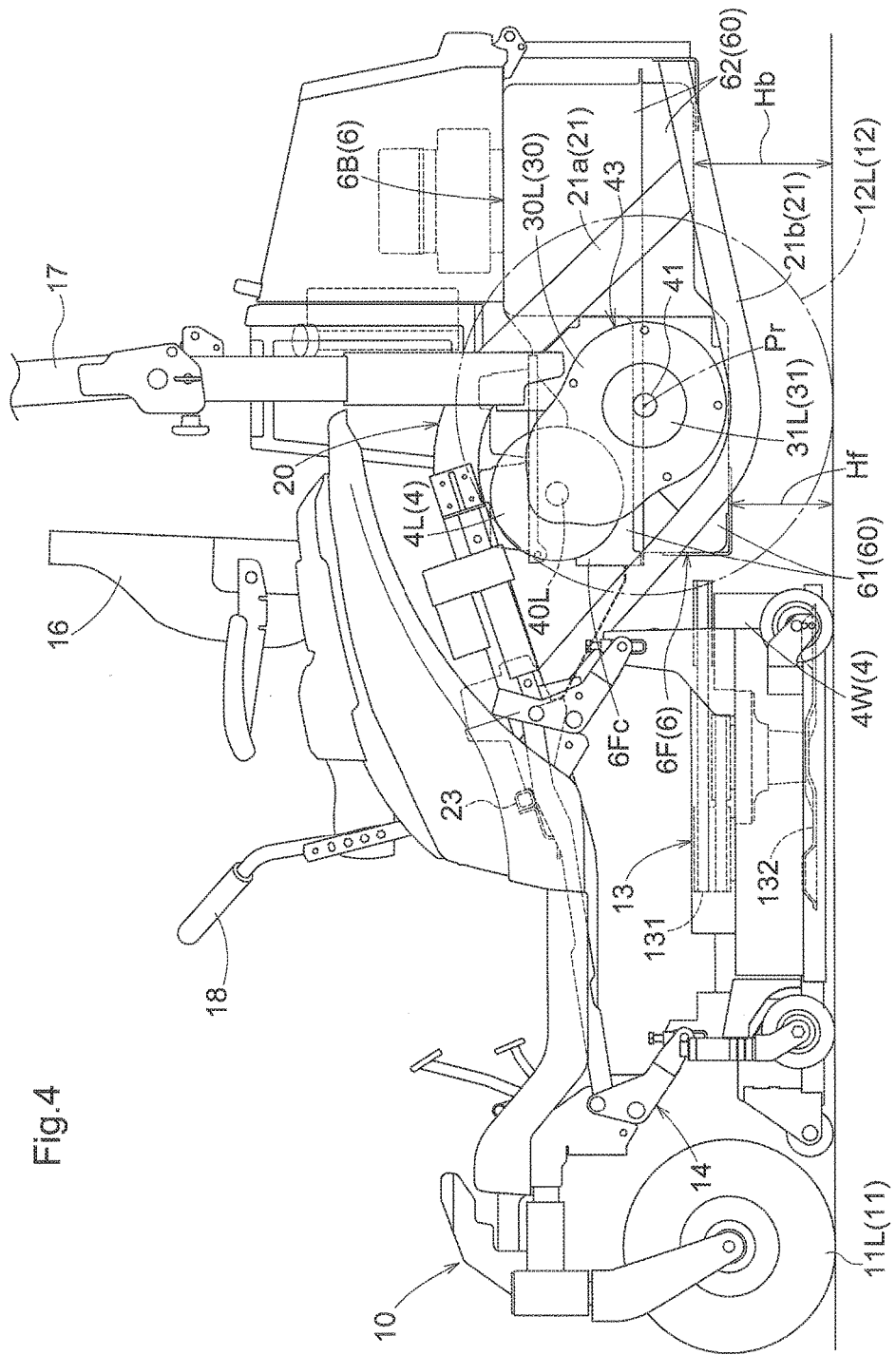
FIG. 4 is a side view of a riding electric mower, which is an example of an electric work vehicle.

Next, a specific example of an electric work vehicle on which a battery pack is mounted will be described. FIG. 4 is a side view of a riding electric mower, which is an example of an electric work vehicle, and FIG. 5 is a plan view of the riding electric mower.

Figure 5:
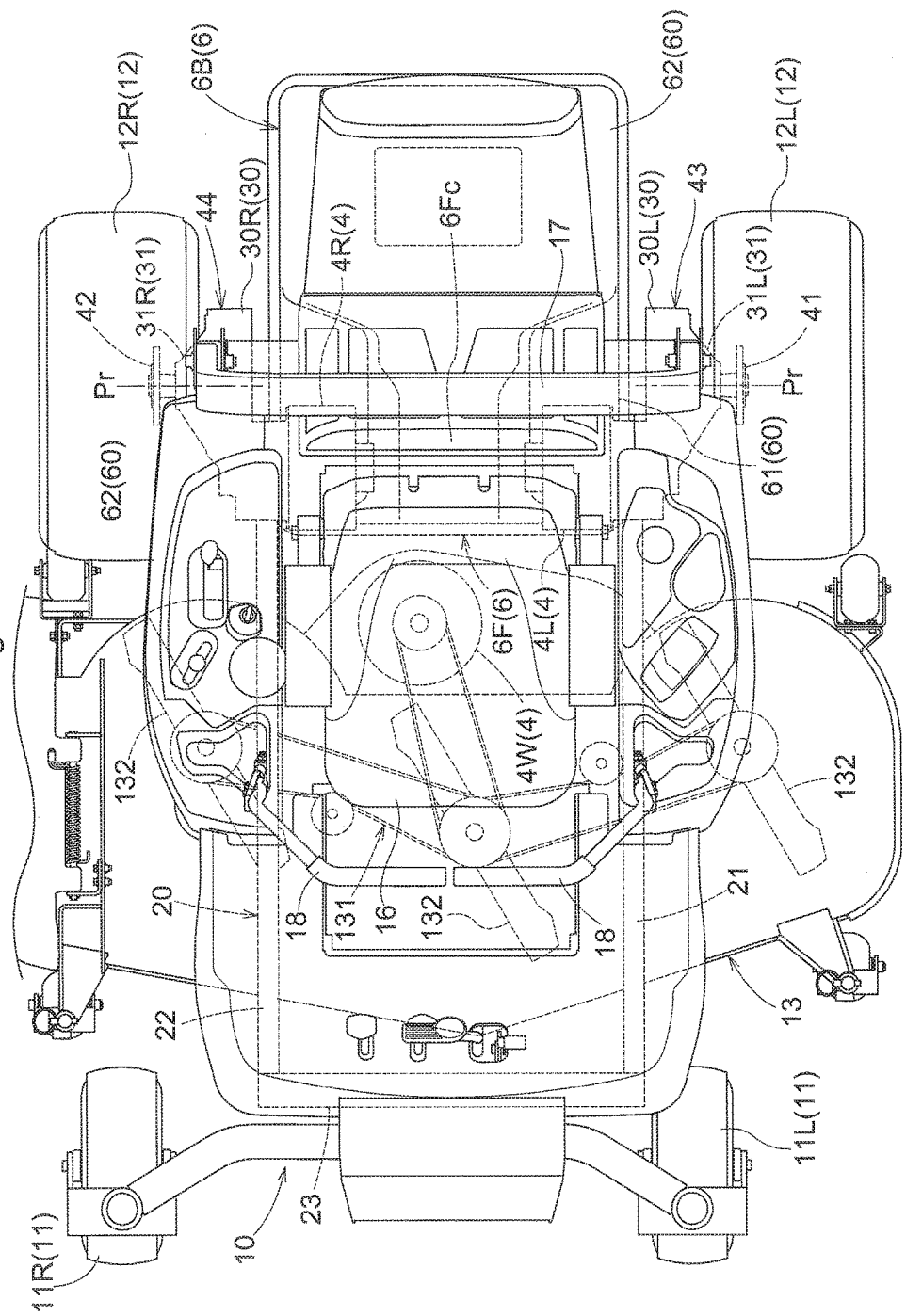
FIG. 5 is a plan view of the riding electric mower.

As shown in FIGS. 4 and 5, the riding electric mower (hereinafter referred to as simply "mower") includes a vehicle body 10. The vehicle body 10 is supported on the ground by a caster-type front wheel unit 11 having a left front wheel 11L and a right front wheel 11R, and by a rear wheel unit 12 including a left rear wheel 12L and a right rear wheel 12R which are rotatably driven. The vehicle body 10 has a vehicle body frame 20 as a base frame. The vehicle body frame 20 includes a left frame 21, a right frame 22, and a crossbeam 23 that joins the left frame 21 and the right frame 22. A mower unit 13 hangs down from the vehicle body frame 20 via a link mechanism 14 between the front wheel unit 11 and the rear wheel unit 12. The mower unit 13 includes a blade transmission mechanism 131 and a blade 132 rotated by the blade transmission mechanism 131. A driver seat 16 is arranged in a central region in the vehicle body front-rear direction of the vehicle body 10. The basic structure of the battery pack 6 and the basic arrangement of the vehicle body frame 20 employ those described with reference to FIGS. 1 and 2.

Figure 6:
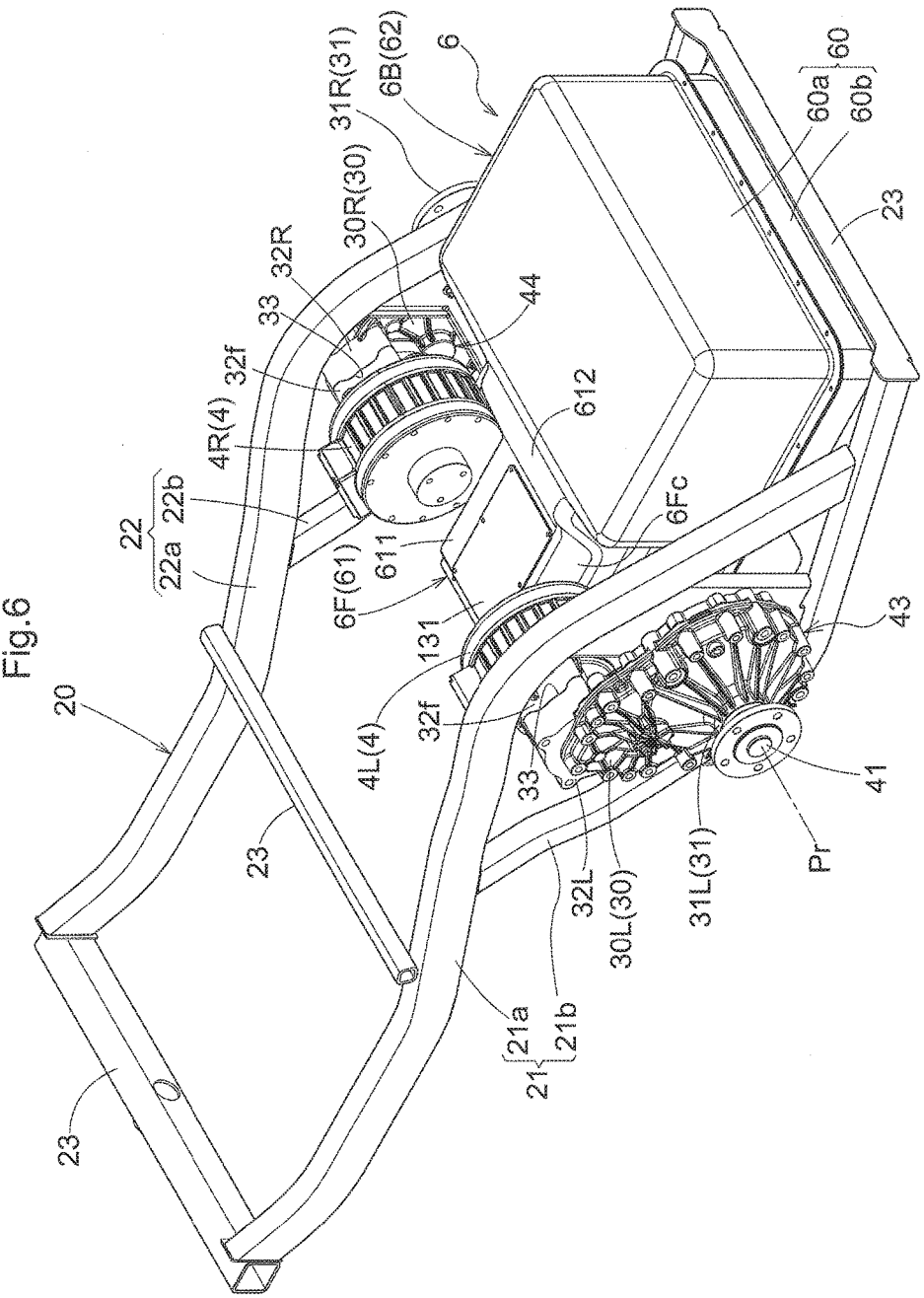
FIG. 6 is a schematic view showing a vehicle body frame, the battery pack, and a driving mechanism for a rear wheel unit.
Figure 7:
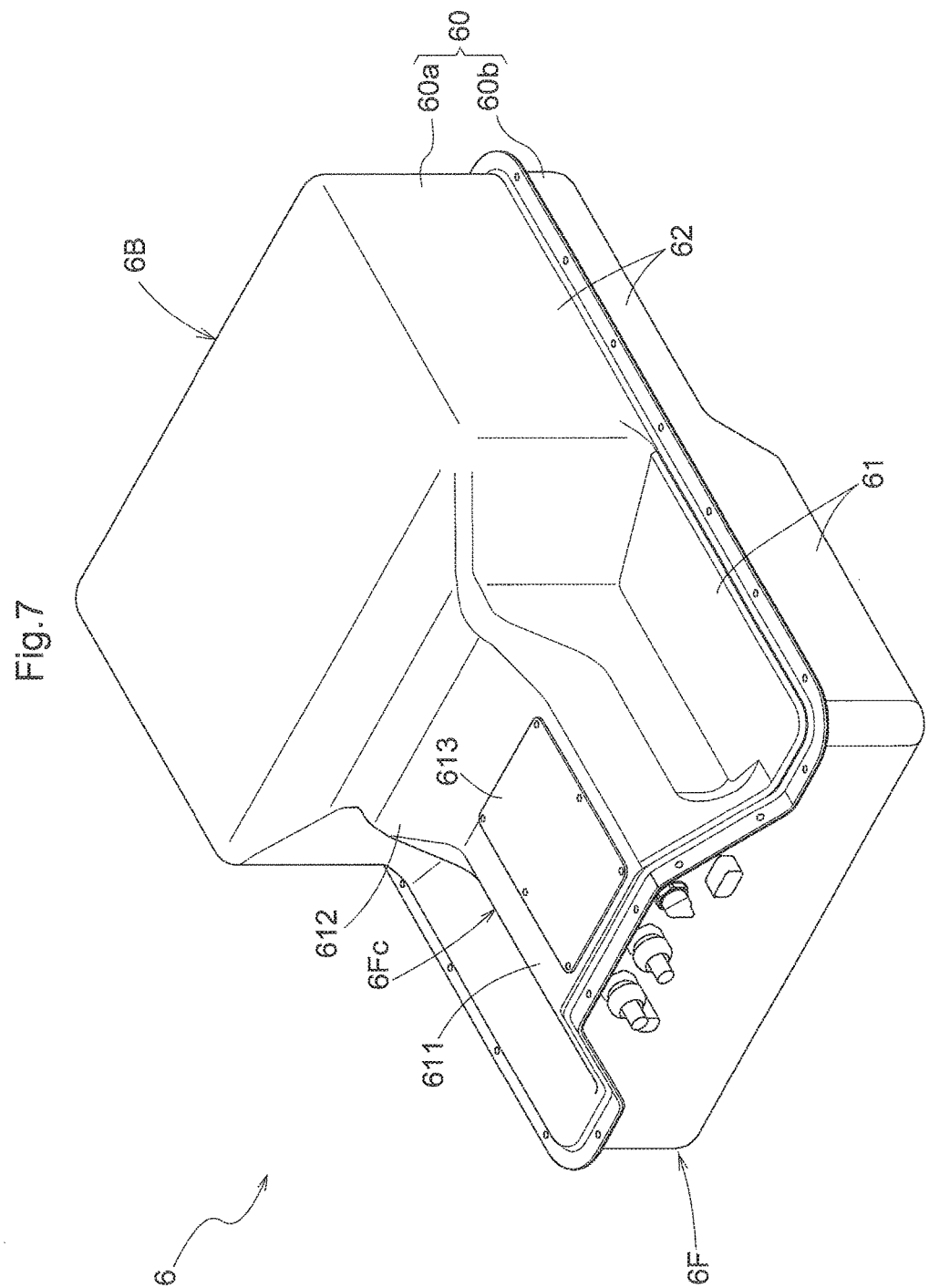
FIG. 7 is a schematic view of the battery pack.

FIG. 6 is a perspective view showing the vehicle body frame 20, the battery pack 6 and the drive mechanism for the rear wheel unit 12. The drive mechanism that supplies the rotational power to the rear wheel unit 12 includes a motor 4, a transmission case 30 and the rear axle case 31. As shown in FIG. 6, the left frame 21 and the right frame 22 each branch vertically from an intermediate region and re-join in a rear region. In other words, in the rear half region, the left frame 21 includes an upper frame portion 21a and a lower frame portion 21b. Similarly, in the rear half region, the right frame 22 includes an upper frame portion 22a and a lower frame portion 22b. In a side view, a left transmission case 30L is arranged in the region between the upper frame portion 21a and the lower frame portion 21b of the left frame 21, and a right transmission case 30R is arranged in the region between the upper frame portion 22a and the lower frame portion 22b of the right frame 22. A left rear axle case 31L is connected to the left transmission case 30L, and the left rear wheel 12L is supported by the left rear axle case 31L. A right rear axle case 31R is connected to the right transmission case 30R, and the right rear wheel 12R is supported by the right rear axle case 31R. The left rear axle case 31L is a tubular member in which the left rear axle 41 of the left rear wheel 12L is mounted, and which performs bearing support, and the outer shape thereof is a truncated cone shape. Similarly, the right rear axle case 31R is a tubular member in which the right rear axle 42 of the right rear wheel 12R is mounted, and which performs bearing support, and the outer shape thereof is a truncated cone shape. The battery pack 6 is arranged such that, in plan view, the center of gravity of the battery pack 6 is approximately located on a center line in the vehicle body front-rear direction and is within the length of the rear wheel radius on the front side and rear side from the rear axle center Pr.

The left transmission case 30L is a hollow member that extends forward in the vehicle body front-rear direction from the left rear axle case 31L orthogonally to the rear axle center Pr which acts also as the central axis center of the left rear axle case 31L, and the left transmission having a gear transmission mechanism is housed within the left transmission case 30L. A surface for mounting the left motor 4L is formed on a power input portion 32f of the left transmission case 30L. Similarly, the right transmission case 30R is a hollow member that extends forward in the vehicle body front-rear direction from the right rear axle case 31R orthogonally to the rear axle center Pr which acts also as the central axis center of the right rear axle case 31R, and the right transmission having a gear transmission mechanism is housed within the right transmission case 30R. The gear transmission mechanism generally reduces the input power, but may increase the input power. Still alternatively, there may be provided a gear transmission mechanism that does not increase and reduce the input power. A surface for mounting the right motor 4R is formed on the power input portion 32f of the right transmission. In this embodiment, the left transmission case 30L and the left rear axle case 31L are formed integral, and the right transmission case 30R and the right rear axle case 31R are formed integral. Note that instead of the gear transmission mechanism, a chain transmission mechanism, a transmission shaft mechanism or the like may be used as the left transmission and the right transmission.

Speed changing operations on the left motor 4L and the right motor 4R are performed using a left and right pair of speed changing levers 18 (see FIGS. 4 and 5), which are arranged on both sides of the driver seat 16. When a speed changing lever 18 is held at a front-rear neutral position, the corresponding motor 4 enters a stopped state; and by operating the speed changing lever 18 forward from the neutral position, the corresponding motor 4 performs driving so as to rotate normally and realizes a forward speed change, and by operating the speed changing lever 18 rearward, the corresponding motor 4 performs driving so as to rotate in reverse, thereby realizing a reverse speed change. By independently operating the left and right pair of speed changing levers 18, the left motor 4L and the right motor 4R are independently subjected to variable speed driving control. For example, when the left and right pair of speed changing levers 18 are operated by approximately the same operation amount in the forward direction from the neutral position, both the left rear wheel 12L and the right rear wheel 12R are driven at approximately the same speed, and the vehicle body 10 travels forward linearly. When the left and right pair of speed changing levers 18 are operated by approximately the same operation amount in the rearward direction from the neutral position, the left rear wheel 12L and the right rear wheel 12R are driven in the reverse direction at approximately the same speed, and the vehicle body 10 travels in reverse linearly. Furthermore, when the left and right pair of speed changing levers 18 are operated by mutually different operation amounts, the left rear wheel 12L and the right rear wheel 12R are driven at different speeds, and the vehicle body 10 turns. In such a case, a turn with a small radius can be performed by setting one of the left rear wheel 12L and the right rear wheel 12R to a low speed close to zero and operating the other to the forward side or the reverse side at a high speed. Furthermore, by driving the left rear wheel 12L and the right rear wheel 12R in mutually opposite directions, it is possible to cause the vehicle body 10 to perform a spin turn using the approximate central portion of the rear wheel unit 12 as the turn center.

With reference to FIGS. 6, 7, 8 and 9, a detailed configuration of the battery pack 6 will be described next. The battery pack 6 includes multiple battery modules 6A accommodated in the battery case 60. In the description of the basic configuration of the battery pack 6 with reference to FIGS. 1, 2 and 3, the battery pack 6 is described as an integral unit including the battery case 60 and the battery module 6A. The front half of the battery pack 6 is defined as the front-side rectangular cuboid portion 6F, and the rear half of the battery pack 6 is defined as the rear-side rectangular cuboid portion 6B. Furthermore, the protruding central portion 6Fc is formed on the upper half of the front-side rectangular cuboid portion 6F, the left motor 4L is arranged in the space on the left side of the central portion 6Fc, and the right motor 4R is in the space on the right side of the central portion 6Fc. Such an arrangement structure is employed also in the present embodiment. In the description of the battery pack 6 hereinafter, however, the structure of the battery case 60 and the structure of the battery modules 6A, which are originally separate members, will be described separately.

The battery case 60 is a molded product divided into an upper portion and a lower portion, forming an upper case 60a and a lower case 60b, respectively. However, in order to facilitate the description of the internal structure, the battery case 60 will be described as being divided into a front case portion 61 and a rear case portion 62.

The front case portion 61 is a three-dimensional member with an upper portion on which the protruding central portion 611 is formed by recessing the upper left portion and upper right portion of a rectangular cuboid. In other words, on both sides in the vehicle body lateral direction of the central portion 611, the length in the vehicle body lateral direction is shorter to form motor-accommodating spaces that allow the left motor 4L and the right motor 4R to enter, respectively. The rear case portion 62 is a rectangular cuboid connected to the front case portion 61 in the front-rear direction. The front case portion 61 and the rear case portion 62 are connected in an orientation in which the rear case portion 62 is shifted upward, and the battery case 60 has a three-dimensional shape with a vertical level difference between the front side and the rear side. Note that the central portion 611 has an enlarged portion 612 that is enlarged on the left and right and upward in the region connecting the front case portion 61 and the rear case portion 62, and the internal space of the enlarged portion 612 is expanded.

The rear case portion 62 has a rectangular cuboid shape with the same lateral width (length in the vehicle body lateral direction) as the front case portion 61. The rear case portion 62 is shifted upward relative to the front case portion 61, whereby the battery case 60 has a level-difference three-dimensional shape with a level difference between the front case portion 61 and the rear case portion 62.

Figure 8:
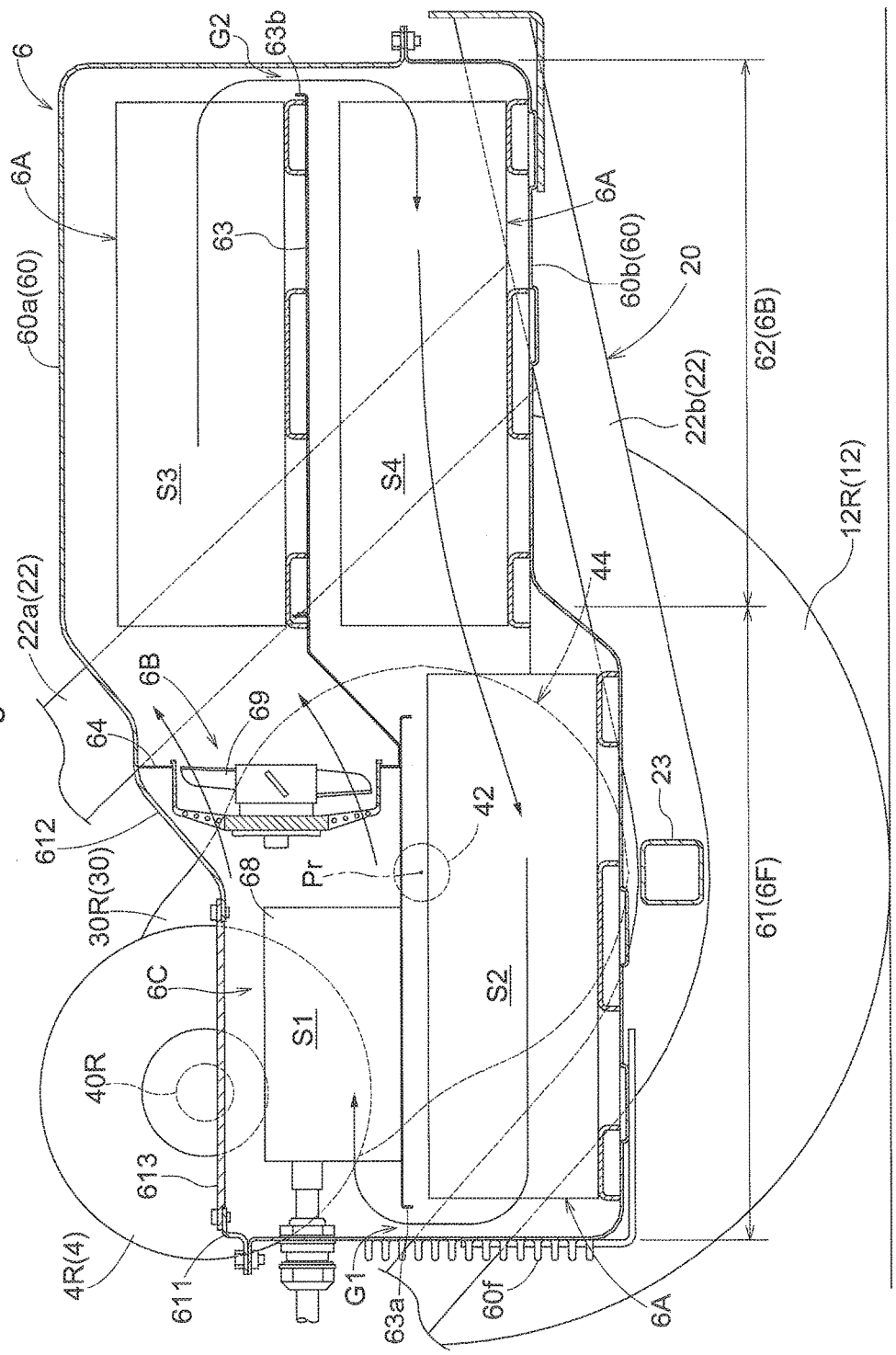
FIG. 8 is a view in vertical section of the battery pack.
Figure 9:
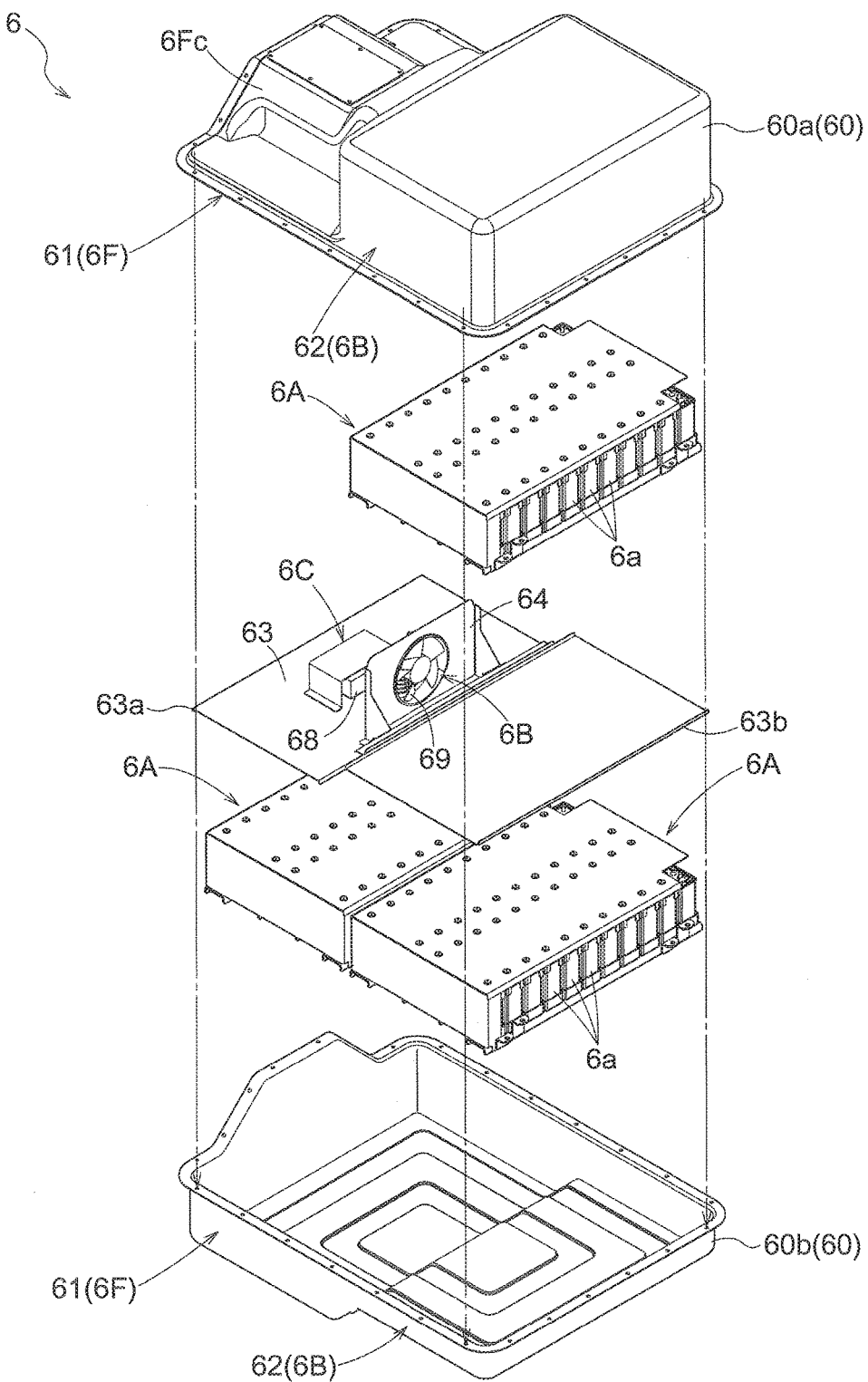
FIG. 9 is an exploded view of a battery case.

As shown in FIGS. 8 and 9, the interior of the battery case 60 divided into the upper case 60a and the lower case 60b is provided with a horizontal partitioning wall 63, which divides the interior into upper and lower spanning across the front case portion 61 and the rear case portion 62. The interior of the front case portion 61 is divided into the first space S1 on the upper side and the second space S2 on the lower side by the horizontal partitioning wall 63, and the interior of the rear case portion 62 is divided into the third space S3 on the upper side and the fourth space S4 on the lower side by the horizontal partitioning wall 63. The horizontal partitioning wall 63 is a plate member that is formed through a bending process so as to have a vertical level difference similar to that of the battery case 60; and the second space S2, the third space S3 and the fourth space S4 have approximately the same shape and volume. The width and height of the first space S1 are smaller than those of the other spaces. A vertical partitioning wall 64 is provided between the first space S1 and the third space S3.

Battery modules 6A of the same specification are accommodated in the second space S2, the third space S3 and the fourth space S4. As shown in FIG. 9, the battery module 6A is a rectangular cuboid whose height is lower compared to its longitudinal dimension and lateral dimension. A multiple of battery cells 6a are accommodated in the interior of the battery module 6A.

The first space S1 accommodates an electric unit 68 including a relay, a fuse and the like which are provided on an electrical wire for interconnecting the battery modules 6A and an external device. A circulation fan 69, which suctions the air in the first space S1 and sends it to the third space S3, is mounted on the vertical partitioning wall 64. The electrical system for the circulation fan 69 is incorporated in the electric unit 68. A front end gap G1 is formed between a front end 63a of the horizontal partitioning wall 63 and the front case portion 61, and a rear end gap G2 is formed between a rear end 63b of the horizontal partitioning wall 63 and the rear case portion 62. Furthermore, the battery case 60 has a sealed construction such that grass and waste are not taken into the interior space of the battery case 60 from the outside, or such that air flow between the interior space and the outside is suppressed. Accordingly, in the interior of the battery case 60, a circulated air flow path (indicated by the arrows in FIG. 8) is formed which starts from the circulation fan 69, passes through the third space S3, the fourth space S4 and the second space S2 to reach the first space S1, and returns to the circulation fan 69. The temperatures of the four spaces in the battery case 60 are equalized by the circulated air that flows on the circulated air flow path. Also, the electric unit 68 is cooled by such circulated air. In order to improve the cooling effect, fins 60f are provided on the wall surface of the battery case 60, although this is shown only partially in the drawing. The fins 60f can be formed on one or both of the inner wall surface and the outer wall surface of the battery case 60.

The upper wall of the front case portion 61 is provided with an opening for maintenance inspection of the electric unit 68, and is usually closed by a lid 613.

As shown in FIG. 4, in the present embodiment, a work motor 4W that provides power to the mower unit 13 serving as the work apparatus is arranged on the rear portion of the mower unit 13, and the power from the work motor 4W is transmitted to the blade transmission mechanism 131 via a belt. Instead of this, the work motor 4W can be arranged on the front side of the battery pack 6. In such a case, a PTO shaft (power takeoff shaft), including an output shaft and a relay shaft from the work motor 4W, extends forward in the vehicle body front-rear direction, whereby the power from the work motor 4W is transmitted to the blade transmission mechanism 131 of the mower unit 13 via the PTO shaft.

Other Embodiments in the First Embodiment (1) In the above-described embodiment, the battery electric unit 68 is accommodated in the first space S1, but this is not limitative. Instead thereof, the battery electric unit 68 may be accommodated in one of the second space S2, the third space S3 and the fourth space S4; and the battery modules 6A may be accommodated each within the remainder (i.e. each of the others of the four spaces S1-S4).

(2) In the above-described embodiment, a riding electric mower is illustrated as an example of the electric work vehicle in which the battery pack is mounted, but this is not limitative. Instead thereof, the battery pack can also be mounted in another electric work vehicle, such as an electric rice transplanter, an electric tractor, etc.

Second Embodiment

Figure 10:
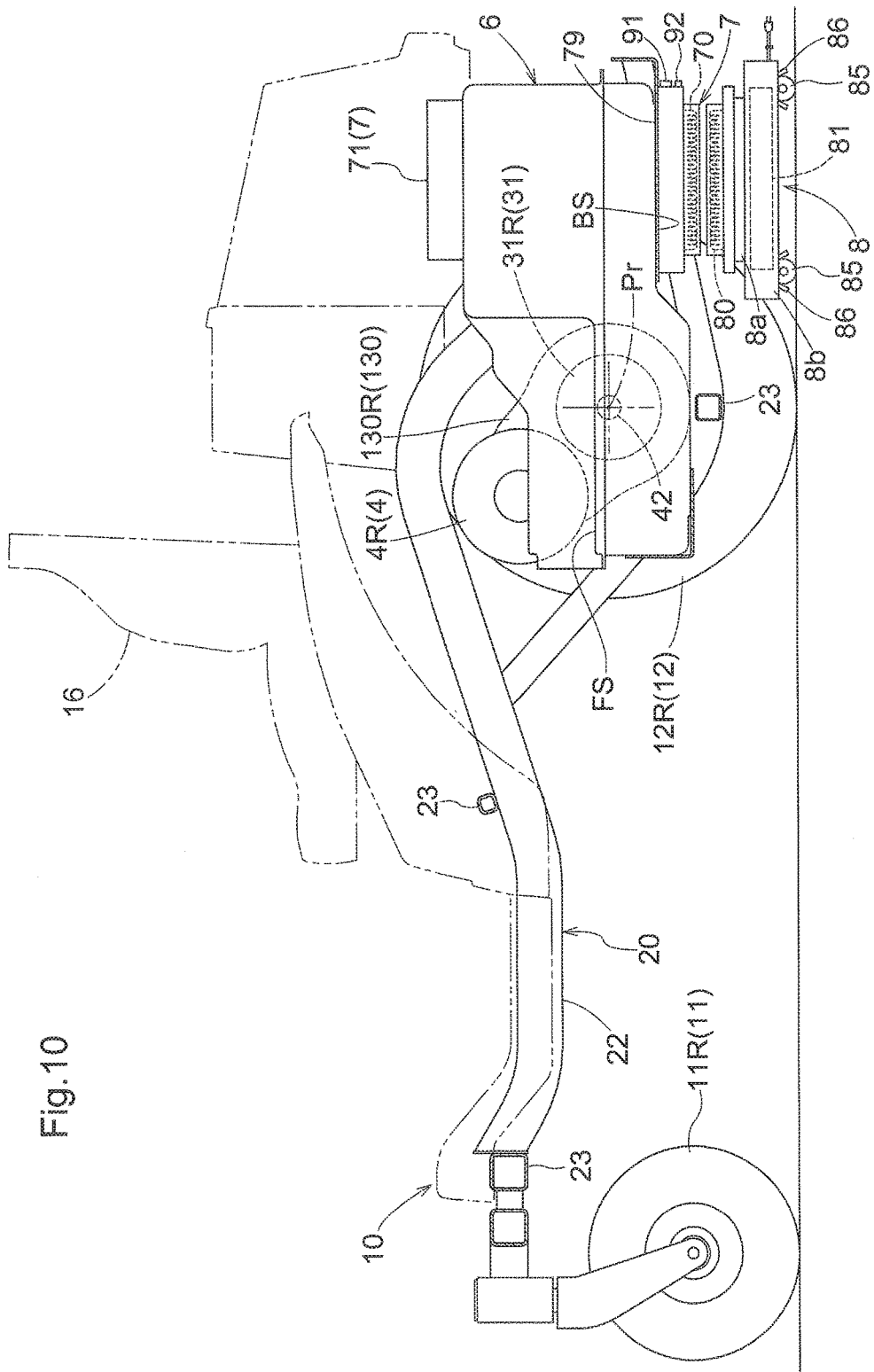
FIG. 10 is a diagram showing a second embodiment (same through to FIG. 16), and is a side view schematically showing a basic configuration of an electric work vehicle in which a contactless charging system is incorporated.
Figure 11:
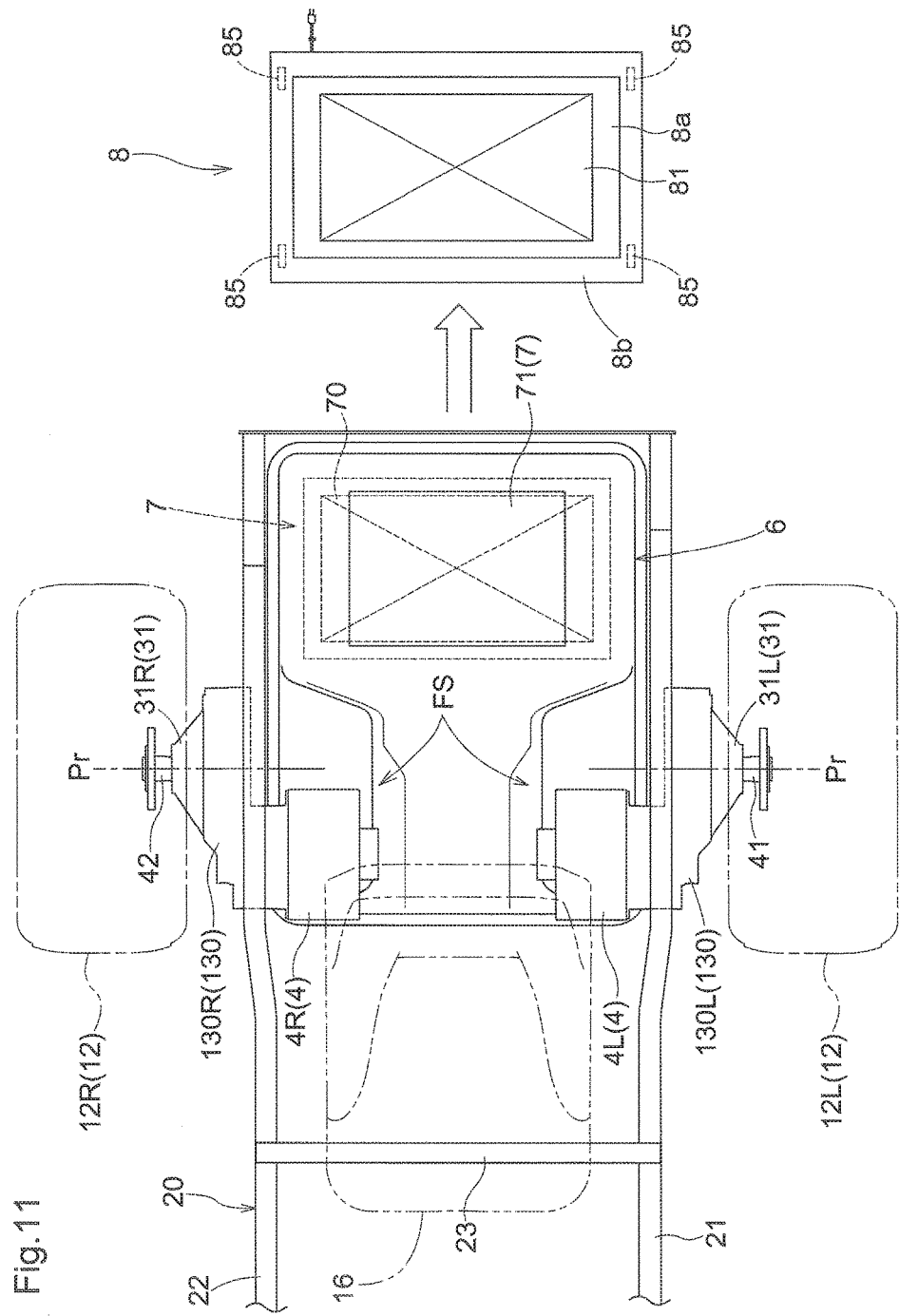
FIG. 11 is a plan view schematically showing a basic configuration of the electric work vehicle in which the contactless charging system is incorporated.

A basic configuration of an electric work vehicle in which a contactless charging system is incorporated will be described with reference to FIGS. 10 and 11.

The electric work vehicle includes a vehicle body frame 20 that includes a left frame 21 and a right frame 22 that extend in the vehicle body front-rear direction with an interval therebetween in the vehicle body lateral direction, and at least one crossbeam 23 that connects the left frame 21 and the right frame 22. A left front wheel 11L and a right front wheel 11R that constitute a front wheel unit 11 are arranged at the front portion of the vehicle body frame 20. A left rear wheel 12L and a right rear wheel 12R that constitute a rear wheel unit 12 are arranged rearward of the center of the vehicle body frame 20. Hereinafter, if there is no particular need to make a distinction, the left front wheel 11L and the right front wheel 11R will be referred to collectively as "front wheel unit 11", and the left rear wheel 12L and the right rear wheel 12R will be referred to collectively as "rear wheel unit 12". A rear axle center Pr extends in a vehicle body lateral direction.

The battery pack 6 is arranged in a region in the rear half of the vehicle body frame 20 between the left frame 21 and the right frame 22, and in a lateral side view. The front end portion of the battery pack 6 is located forward of the rear axle center Pr and approximately near the front end of the rear wheel unit 12. The rear end of the battery pack 6 is located approximately at the rear end of the vehicle body frame 20. As is apparent from FIG. 11, the battery pack 6 has a width sufficient to snugly fit the battery pack 6 between the left frame 21 and the right frame 22 and extends with an equal width in the vehicle body front-rear direction. Also, the front half of the battery pack 6 enters the axle space of the rear wheel unit 12. The battery pack 6 has a shape obtained by cutting away a front-side upper portion region and a rear-side lower portion region from an approximate rectangular cuboid, the cutaway rear-side lower portion region creates a flat rectangular cuboid-shaped rear recessed portion BS, and the cut away front-side upper portion region creates a flat rectangular cuboid-shaped front recessed portion FS.

The motor 4, that drives the rear wheel unit 12, i.e. the driving wheels, includes a left motor 4L that transmits rotational power to the left rear wheel 12L, and a right motor 4R that transmits rotational power to the right rear wheel 12R. As shown in FIG. 11, the left motor 4L enters the left side region of the front recessed portion FS. The right motor 4R enters the right side region of the front recessed portion FS. The left motor 4L and the right motor 4R are arranged at positions that are left-right symmetrical. The left motor 4L and the right rear axle case 31L are joined by a left transmission 130L, and the right motor 4R and the right rear axle case 31R are joined by a right transmission 130R. The left transmission 130L is arranged on the outside of the left frame 21, and the right transmission 130R is arranged on the outside of the right frame 22. The left motor 4L and the right motor 4R are collectively referred to as an "electric motor unit" as well. The left transmission 130L and the right transmission 130R are collectively referred to as a "transmission 130". The left rear axle case 31L and the right rear axle case 31R are collectively referred to as a "rear axle case 31". A driver seat 16 is arranged above the electric motor unit (motor 4), and thus the space is used effectively.

A contactless charging system, that charges the battery pack 6 without coming into contact therewith, includes a primary coil unit 8 arranged on a ground surface, and a secondary coil unit 7 attached to the electric work vehicle. In the example as shown in FIG. 10, the primary coil unit 8 has a two-stage structure, a coil power supply circuit portion 81 is arranged on the lower stage, a primary coil 80 is arranged on the upper stage, and an elevation mechanism 8a is provided between the coil power supply circuit portion 81 and the primary coil 80. The above-ground height of the primary coil 80 can be adjusted using the elevation mechanism 8a. A box-shaped housing 8b accommodates the coil power supply circuit portion 81, the primary coil 80 and the elevation mechanism 8a; and the housing 8b is provided with wheels 85 for moving the primary coil unit 8, and stoppers 86 for holding a stopped position of the primary coil unit 8. The secondary coil unit 7 includes a secondary coil 70 that electromagnetically couples with the primary coil 80, and a charging circuit portion 71 that rectifies the power from the secondary coil 70 and supplies the rectified power to the battery pack 6. In the example as shown in FIG. 10, the secondary coil 70 and the charging circuit portion 71 that constitute the secondary coil unit 7 are not formed integral with each other, but the secondary coil 70 is arranged below the battery pack 6, and the charging circuit portion 71 is arranged on the upper part of the battery pack 6. The secondary coil 70 enters a rear recessed portion BS, which is a recessed portion formed in the lower portion of the battery pack 6, and the secondary coil 70 is supported by one or both of the battery pack 6 and the vehicle body frame 20 using a coil support member 79.

Figure 12:
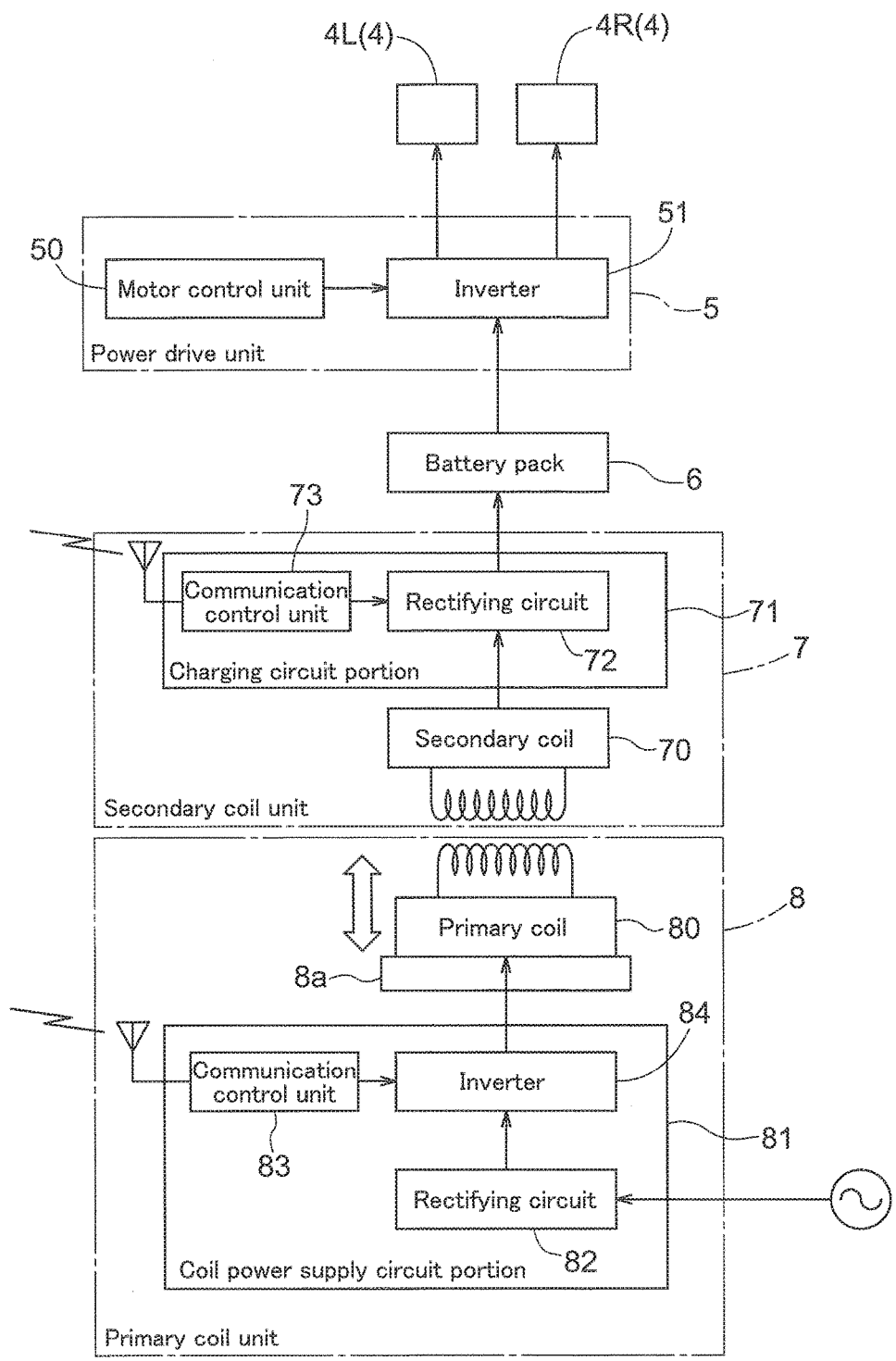
FIG. 12 is a functional block diagram showing a basic configuration of an electric circuit of the contactless charging system.

As shown in FIG. 12, the coil power supply circuit portion 81 of the primary coil unit 8 includes a rectifying circuit 82, a communication control unit 83 and an inverter 84. The charging circuit portion 71 of the secondary coil unit 7 includes a rectifying circuit 72 and a communication control unit 73. The rectifying circuit 82 is connected to a commercial power source via a power source cable to generate a DC voltage, and provides the inverter 84 with the generated DC voltage. The inverter 84 generates an alternating voltage using the input DC voltage and causes the alternating voltage to flow through the primary coil 80. The alternating voltage generated by the secondary coil 70 that is electromagnetically coupled to the primary coil 80 is allowed to flow through the rectifying circuit 72 of the charging circuit portion 71, whereby a charging DC voltage with a predetermined voltage value is outputted from the rectifying circuit 72. The rectifying circuit 72 is connected to the battery pack 6, and a charging current is supplied to the battery pack 6 using the charging DC voltage.

The communication control unit 83 of the coil power supply circuit portion 81 and the communication control unit 73 of the charging circuit portion 71 can exchange information through wireless communication. During the charging of the battery pack 6, charging information is exchanged to control the coil power supply circuit portion 81 and the charging circuit portion 71. A notifying device (a buzzer 91, a lamp 92, or the like, see FIG. 10), that notifies a driver or an operator that the primary coil 80 and the secondary coil 70 are at appropriate positions, is included in one or both of the coil power supply circuit portion 81 and the charging circuit portion 71.

Note that the battery pack 6 is connected to a power drive unit 5 serving as an output destination. A motor control unit 50 and an inverter 51 are included in the power drive unit 5, and a motor drive current, which is outputted from the inverter 51 based on a control signal from the motor control unit 50, is sent to the left motor 4L and the right motor 4R.

Figure 13:
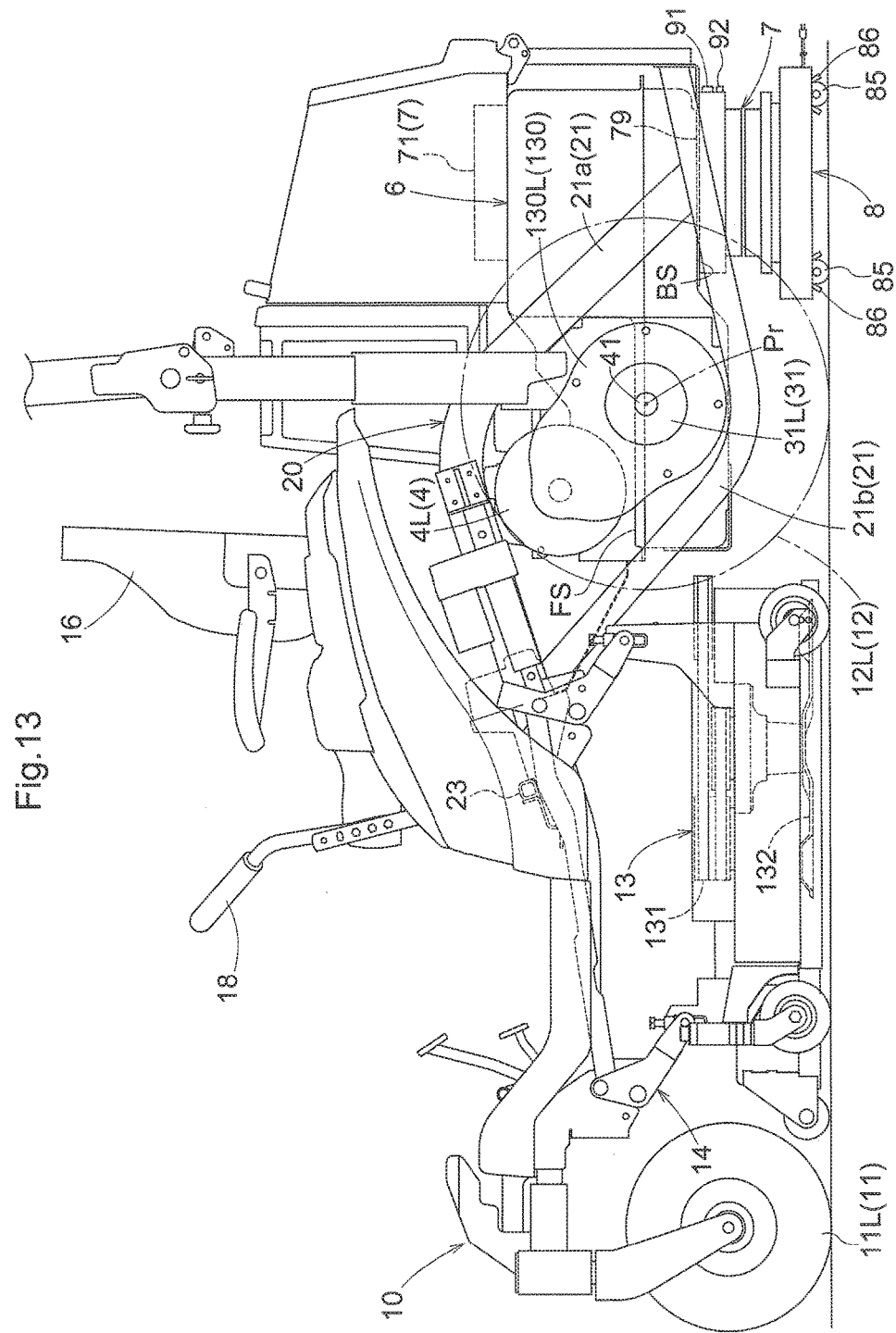
FIG. 13 is a side view of an electric mower.
Figure 14:
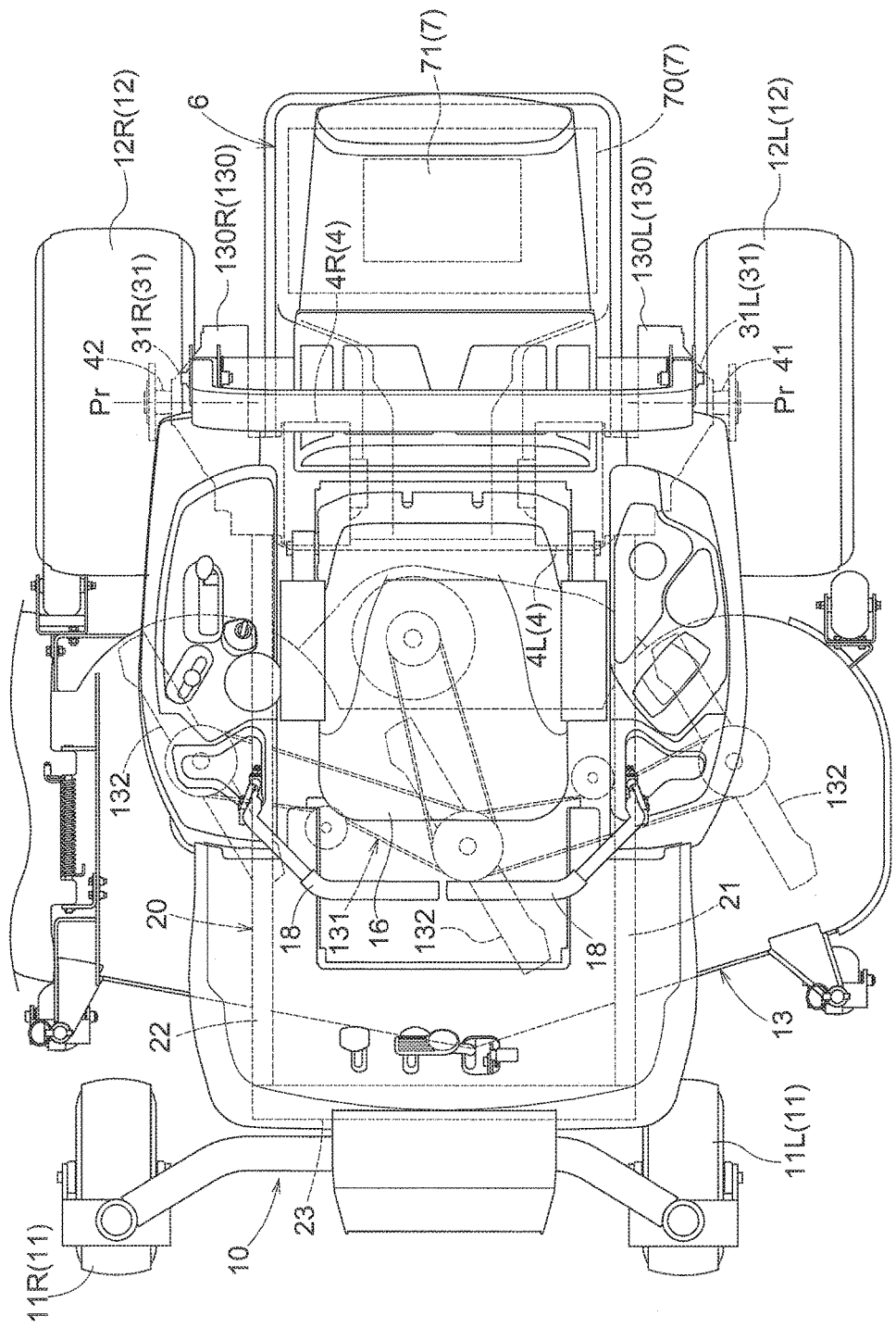
FIG. 14 is a plan view of the electric mower.

One specific embodiment of the electric work vehicle will be described next with reference to the drawings. FIG. 13 is a side view of a mid-mount electric mower, which is an example of an electric work vehicle, and FIG. 14 is a plan view of the mid-mount electric mower. The electric mower (hereinafter referred to simply as "mower") employs the contactless charging system as described above with reference to FIGS. 10, 11 and 12.

As shown in FIGS. 13 and 14, the mower includes the vehicle body 10. The vehicle body 10 is supported on the ground by a caster-type front wheel unit 11 including a left front wheel 11L and a right front wheel 11R, and by a rear wheel unit 12 including a left rear wheel 12L and a right rear wheel 12R which are rotatably driven. The vehicle body 10 has a vehicle body frame 20 as a base frame. The vehicle body frame 20 includes the left frame 21, the right frame 22, and the crossbeam 23 that joins the left frame 21 and the right frame 22. A mower unit 13 hangs down from the vehicle body frame 20 via a link mechanism 14 between the front wheel unit 11 and the rear wheel unit 12. The mower unit 13 includes a blade transmission mechanism 131 and blades 132 that are rotated by the blade transmission mechanism 131. A driver seat 16 is arranged in a central region in the vehicle body front-rear direction of the vehicle body 10.

Figure 15:
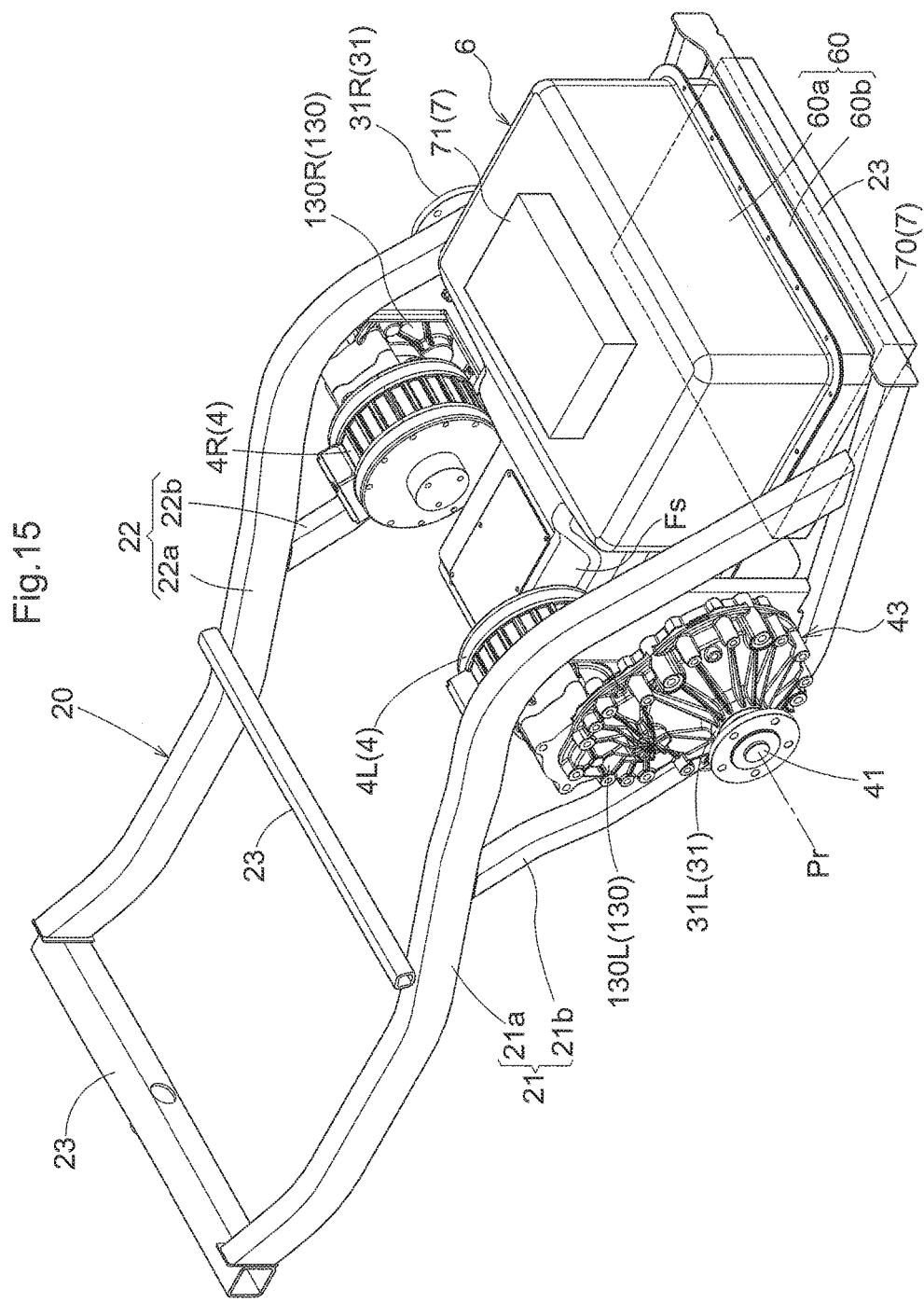
FIG. 15 is a perspective view showing a support structure for the battery pack, an electric motor unit, and a transmission in the vehicle body frame.

As shown in FIG. 15, the left frame 21 and the right frame 22 each branch vertically from a front/rear central region and rejoin in a rear region in the front-rear direction. In more particular, the left frame 21 includes an upper frame portion 21a and a lower frame portion 21b in the rear half region thereof. Similarly, the right frame 22 includes an upper frame portion 22a and a lower frame portion 22b in the rear half region thereof. In a lateral side view, a left transmission 130L is arranged in the region between the upper frame portion 21a and the lower frame portion 21b of the left frame 21, and a right transmission 130R is arranged in the region between the upper frame portion 22a and the lower frame portion 22b of the right frame 22. A left rear axle case 31L is connected to the left transmission 130L, and the left rear wheel 12L is supported by the left rear axle case 31L. A right rear axle case 31R is connected to the right transmission 130R, and the right rear wheel 12R is supported by the right rear axle case 31R. The left rear axle case 31L is a tubular member in which the left rear axle 41 of the left rear wheel 12L is mounted, and which performs bearing support, and the outer shape thereof is a truncated cone shape. Similarly, the right rear axle case 31R is a tubular member in which the right rear axle 42 of the right rear wheel 12R is mounted, and which performs bearing support, and the outer shape thereof is a truncated cone shape. The battery pack 6 is arranged such that, in plan view, the center of gravity of the battery pack 6 is approximately located on the center line in the vehicle body front-rear direction and falls within the length of the rear wheel radius on the front side and rear side from the rear axle center Pr.

The left transmission 130L includes a gear transmission mechanism and extends forward in the vehicle body front-rear direction orthogonally to the rear axle center Pr, which acts also as the central axle center of the left rear axle case 31L. The left transmission 130L and the left rear axle case 31L are formed integral, and the left motor 4L is joined to the input portion of the left transmission 130L. Similarly, the right transmission 130R includes a gear transmission mechanism, and extends forward in the vehicle body front-rear direction so as to be orthogonal to the rear axle center Pr, which acts also as the central axis center of the right rear axle case 31R. The right transmission 130R and the right rear axle case 31R are formed integral, and the right motor 4R is joined to the input portion of the right transmission 130R.

Speed changing operations on the left motor 4L and the right motor 4R are performed using a left and right pair of speed changing levers 18 (see FIGS. 12 and 13), which are arranged on both sides of the driver seat 16. When a speed changing lever 18 is held at a front-rear neutral position, the corresponding left motor 4L or right motor 4R enters the stopped state. By operating the speed changing lever 18 forward from the neutral position, the left motor 4L or right motor 4R performs forward driving and forward speed change is realized, and by operating the speed changing lever 18 rearward, the left motor 4L or right motor 4R performs reverse driving and reverse speed change is realized. By independently operating the left and right pair of speed changing levers 18, the left motor 4L and the right motor 4R can independently perform variable speed driving.

Figure 16:
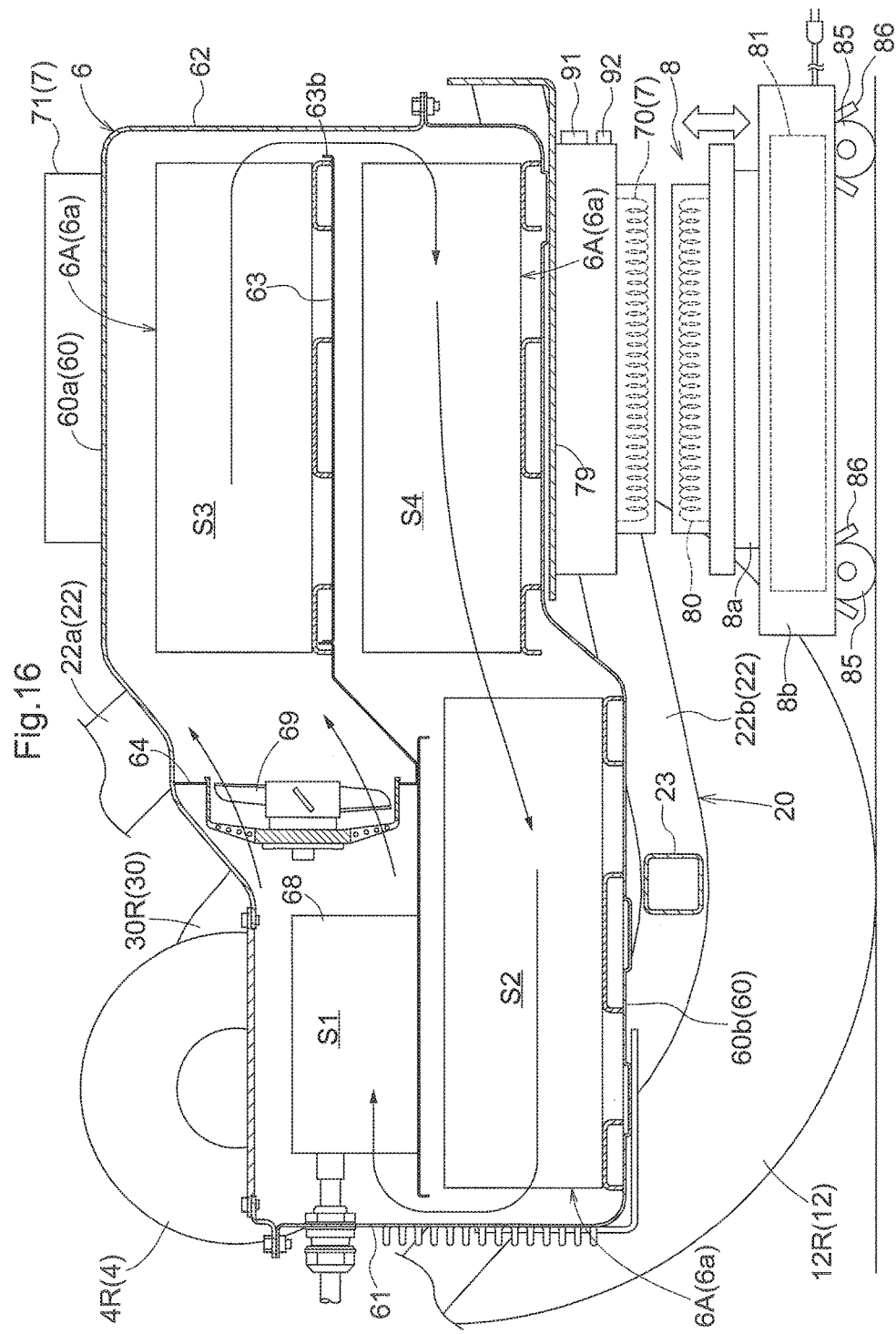
FIG. 16 is a view in vertical section showing a region of the battery pack and the contactless charging system.

As shown in FIGS. 15 and 16, the battery pack 6 includes multiple battery modules 6A accommodated in the battery case 60. The battery case 60 is a molded product divided into an upper and lower portion, and includes an upper case 60a and a lower case 60b. Hereinafter, the front half of the battery case 60 is referred to as a front case portion 61, and the rear half of the battery case 60 is referred to as a rear case portion 62.

The rear case portion 62 is shifted upward relative to the front case portion 61, whereby the battery case 60 has a level-difference cubic shape with a level difference between the front case portion 61 and the rear case portion 62.

As shown in FIG. 16, the interior of the battery case 60 divided into the upper case 60a and the lower case 60b is provided with the horizontal partitioning wall 63, which vertically divides the interior into two portions spanning across the front case portion 61 and the rear case portion 62. The interior of the front case portion 61 is divided into the first space S1 on the upper side and the second space S2 on the lower side by the horizontal partitioning wall 63, and the interior of the rear case portion 62 is divided into the third space S3 on the upper side and the fourth space S4 on the lower side by the horizontal partitioning wall 63. The horizontal partitioning wall 63 is a plate member that is formed through a bending process so as to have a vertical level difference similar to that of the battery case 60, and the second space S2, the third space S3 and the fourth space S4 have approximately the same shape and volume. The width and height of the first space S1 are smaller than those of the other spaces. A vertical partitioning wall 64 is provided between the first space S1 and the third space S3.

The electric unit 68 is accommodated in the first space S1. Battery modules 6A of the same specification are accommodated in the second space S2, the third space S3, and the fourth space S4. A multiple of battery cells 6a are accommodated in the interior of the battery module 6A.

The first space S1 accommodates an electric unit 68 having a relay, a fuse and the like provided on an electrical wire for connecting the battery module 6A with an external device. The circulation fan 69, which suctions the air in the first space S1 and sends it to the third space S3, is mounted on the vertical partitioning wall 64. The electrical system for the circulation fan 69 is incorporated in the electric unit 68. Accordingly, in the interior of the battery case 60, a circulated air flow path (indicated by the arrows in FIG. 16) is formed which starts from the circulation fan 69, passes through the third space S3, the fourth space S4 and the second space S2 to reach the first space S1, and returns to the circulation fan 69. The temperatures of the four spaces in the battery case 60 are equalized by the circulated air that flows on the circulated air flow path.

As shown in FIG. 16, the secondary coil 70 is held by the coil support member 79 so as to oppose the lower surface of the lower case 60b of the battery pack 6. The coil support member 79 is fixed to the vehicle body frame 20 via a crossbar that joins the lower frame portion 21b of the left frame 21 and the lower frame portion 22b of the right frame 22. The secondary coil 70 is arranged between the lower frame portion 21b on the left side and the lower frame portion 22b on the right side in an orientation in which the magnetic force lines thereof are oriented in the vertical direction, and therefore the lower frame portion 21b and the lower frame portion 22b on the right side form a protection fence in the vehicle body lateral direction.

The primary coil unit 8 is moved so that the primary coil 80 is located directly below the secondary coil 70. In such a case, adjustment of the position in the vehicle body lateral direction can be performed by moving the primary coil unit 8, and adjustment of the position in the vehicle body front-rear direction can be performed by slightly moving the mower forward or in reverse. The buzzer 91 and lamp 92 serving as the notifying devices that perform reporting when the primary coil 80 and the secondary coil 70 are in the correct positional relationship (when the correct power is transmitted) are attached to the coil support member 79. A similar notifying device may be provided on the primary coil unit 8. Furthermore, in order to align the primary coil 80 with the secondary coil 70 by operating the mower, a lamp on an operation panel may be used for a notifying device as well.

Other Embodiments in the Second Embodiment (1) In the above-described embodiment, the primary coil 80 and the coil power supply circuit portion 81 of the primary coil unit 8 are arranged in two, upper and lower stages. Instead thereof, the primary coil 80 and the coil power supply circuit portion 81 may be arranged laterally side by side.

(2) In the above-described embodiment, the secondary coil unit 7 is divided into the secondary coil 70 and the charging circuit portion 71 and arranged at the lower portion and the upper portion of the battery pack 6, respectively. Instead thereof, the secondary coil 70 and the charging circuit portion 71 may be formed integral with each other and arranged below the battery pack 6.

(3) In the above-described embodiment, a mid-mount electric mower is given as an example of an electric work vehicle in which a contactless charging system of the present invention is incorporated. Instead thereof, a contactless charging system of the present invention can also be applied to a front-mount electric mower, an agricultural work machine such as a rice transplanter, a combine-harvester and tractor, a construction machine such as a backhoe and a bucket loader or the like.

What is claimed is:

1. An electric work vehicle battery pack, comprising:
   a sealed battery case including a front case portion and a rear case portion;
   a horizontal partitioning wall that divides an interior of the front case portion into a first space and a second space in a vertical direction, and divides an interior of the rear case portion into a third space and a fourth space in the vertical direction;
   a battery electric unit accommodated in one of the first space, the second space, the third space and the fourth space; and
   a battery module accommodated in each of the remaining spaces among the first space, the second space, the third space and the fourth space.

2. The electric work vehicle battery pack according to claim 1, further comprising a circulation fan configured to create a circulated air flow that circulates through the first space, the second space, the third space and the fourth space.

3. The electric work vehicle battery pack according to claim 2, wherein the circulation fan is accommodated in the same space as the battery electric unit.

4. The electric work vehicle battery pack according to claim 1, wherein the rear case portion is shifted upward relative to the front case portion, and the battery case has a level-difference three-dimensional shape in which a level difference is formed between the front case portion and the rear case portion.

5. The electric work vehicle battery pack according to claim 1, wherein the battery case is provided with an opening through which the battery electric unit is exposed to the outside and which is closed by a lid.

6. The electric work vehicle battery pack according to claim 1, wherein a cooling fin is formed on a wall surface of the battery case.

7. An electric work vehicle, comprising:
   a battery pack mounted on a vehicle body;
   a left frame and a right frame that extend in a vehicle body front-rear direction with an interval therebetween in a vehicle body lateral direction; and
   a rear wheel unit having a left rear wheel that is arranged outside in the vehicle body lateral direction of the left frame, and a right rear wheel that is arranged outside in the vehicle body lateral direction of the right frame,
   wherein the battery pack comprises:
   a sealed battery case including a front case portion and a rear case portion;
   a horizontal partitioning wall that divides an interior of the front case portion into a first space and a second space in a vertical direction, and divides an interior of the rear case portion into a third space and a fourth space in the vertical direction;
   a battery electric unit accommodated in one of the first space, the second space, the third space and the fourth space; and
   a battery module accommodated in each of the remaining spaces among the first space, the second space, the third space and the fourth space, and
   a front end of the battery pack is arranged between the left rear wheel and the right rear wheel so as to be located forward of an axle center of the rear wheel unit.

8. An electric work vehicle, comprising:
   a left frame and a right frame that extend in a vehicle body front-rear direction with an interval therebetween in a vehicle body lateral direction;
   a rear wheel unit having a left rear wheel arranged outside of the left frame in the vehicle body lateral direction and a right rear wheel arranged outside of the right frame in the vehicle body lateral direction;
   a battery pack arranged between the left rear wheel and the right rear wheel, a front end of the battery pack being located forward of an axle center of the rear wheel unit in the vehicle body front-rear direction;
   a left motor that is arranged above the front end of the battery pack at a position on a vertical axis extending between the front end of the battery pack and the left motor in the periphery of the left rear wheel and is configured to receive a supply of power from the battery pack and transmit rotational power to the left rear wheel; and
   a right motor that is arranged above the front end of the battery pack at a position on a vertical axis extending between the front end of the battery pack and the right motor in the periphery of the right rear wheel and is configured to receive a supply of power from the battery pack and transmit rotational power to the right rear wheel.

9. The electric work vehicle according to claim 8, wherein in a plan view, a center of gravity of the battery pack is located in a rear wheel segment defined by the left rear wheel and the right rear wheel in the vehicle body front-rear direction and the vehicle body lateral direction.

10. The electric work vehicle according to claim 8, wherein the battery pack includes a front-side rectangular cuboid portion and a rear-side rectangular cuboid portion shifted upward relative to the front-side rectangular cuboid portion, and has a level-difference three-dimensional shape having level differences on an upper surface and a lower surface of the battery pack between the front-side rectangular cuboid portion and the rear-side rectangular cuboid portion.

11. The electric work vehicle according to claim 8, further comprising a rear axle case through which the axle center of the rear wheel unit passes in the vehicle lateral direction,
   wherein a rear end of the battery pack is located rearward of the rear wheel unit in the vehicle body front-rear direction, and
   an above-ground height of the rear end of the battery pack is higher than an above-ground height of the rear axle case.

12. The electric work vehicle according to claim 8, further comprising a front wheel unit including a left front wheel that is arranged on an outer side of the left frame in the vehicle body lateral direction, and a right front wheel that is arranged on an outer side of the right frame in the vehicle body lateral direction,
   wherein a mower unit is arranged between the front wheel unit and the rear wheel unit.

13. The electric work vehicle according to claim 12, further comprising a work motor configured to supply power to the mower unit, the work motor being arranged on a front side with respect to the front end of the battery pack in the vehicle body front-rear direction.

14. The electric work vehicle according to claim 8, wherein
   a left transmission case is arranged on an outer side of the left frame in the vehicle body lateral direction, the left transmission case accommodating a left transmission configured to transmit rotational power from an output shaft of the left motor to an axle of the left rear wheel, and
   a right transmission case is arranged on an outer side of the right frame in the vehicle body lateral direction, the right transmission case accommodating a right transmission configured to transmit rotational power from an output shaft of the right motor to an axle of the right rear wheel.

15. The electric work vehicle according to claim 14, wherein
the left transmission case is joined to the left frame along the vehicle body front-rear direction, and
the right transmission case is joined to the right frame along the vehicle body front-rear direction.

* * * * *